United States Patent
Bromand et al.

(10) Patent No.: US 12,315,490 B2
(45) Date of Patent: May 27, 2025

(54) TEXT-TO-SPEECH AND SPEECH RECOGNITION FOR NOISY ENVIRONMENTS

(71) Applicant: Spotify AB, Stockholm (SE)

(72) Inventors: Daniel Bromand, Boston, MA (US); Björn Erik Roth, Stockholm (SE); Kåre Sjölander, Stockholm (SE)

(73) Assignee: Spotify AB, Stockholm (SE)

( * ) Notice: Subject to any disclaimer, the term of this patent is extended or adjusted under 35 U.S.C. 154(b) by 410 days.

(21) Appl. No.: 17/565,826

(22) Filed: Dec. 30, 2021

(65) Prior Publication Data

US 2022/0208174 A1 Jun. 30, 2022

Related U.S. Application Data

(60) Provisional application No. 63/133,101, filed on Dec. 31, 2020.

(51) Int. Cl.

| | |
|---|---|
| *G10L 13/033* | (2013.01) |
| *G10L 13/08* | (2013.01) |
| *G10L 15/08* | (2006.01) |
| *G10L 15/22* | (2006.01) |
| *G10L 25/84* | (2013.01) |

(52) U.S. Cl.
CPC ............ *G10L 13/033* (2013.01); *G10L 13/08* (2013.01); *G10L 15/08* (2013.01); *G10L 15/22* (2013.01); *G10L 25/84* (2013.01); *G10L 2015/088* (2013.01)

(58) Field of Classification Search
CPC ....... G10L 13/033; G10L 15/20; G10L 15/22; G10L 13/00; G10L 15/02; G10L 21/02; G10L 15/065
See application file for complete search history.

(56) References Cited

U.S. PATENT DOCUMENTS

| | | | |
|---|---|---|---|
| 7,653,761 B2 | 1/2010 | Juster | |
| 8,094,891 B2 | 1/2012 | Andreasson | |
| 8,571,871 B1 * | 10/2013 | Stuttle | .................. G10L 13/033 704/260 |
| 8,589,167 B2 * | 11/2013 | Baughman | .............. G10L 17/26 704/231 |
| 10,237,256 B1 | 3/2019 | Pena | |
| 10,524,070 B2 | 12/2019 | Kadri | |
| 10,877,718 B2 | 12/2020 | Gosu | |
| 10,885,900 B2 * | 1/2021 | Li | ........................... G10L 25/30 |
| 2006/0020662 A1 | 1/2006 | Robinson | |
| 2006/0212478 A1 | 9/2006 | Plastina | |
| 2007/0113725 A1 | 5/2007 | Oliver | |

(Continued)

*Primary Examiner* — Mark Villena
(74) *Attorney, Agent, or Firm* — McDonnell Boehnen Hulbert & Berghoff LLP

(57) ABSTRACT

The present disclosure relates generally to speech processing. Humans change their speech patterns in noisy environments. The systems and devices described herein can compensate for noisy environments to be more human-like. Thus, the configurations and implementations herein can determine a sound profile for the sound environment where the user is listening. Based on the sound profile, the devices can determine a transform to apply to output speech from the device. This transform is applied to the wake word, speech recognition, and to the output speech to compensate for the noise level of the environment by mimicking the Lombard effect.

20 Claims, 21 Drawing Sheets

(56) References Cited

U.S. PATENT DOCUMENTS

| | | |
|---|---|---|
| 2007/0174866 A1 | 7/2007 | Brown |
| 2007/0276866 A1 | 11/2007 | Bodin |
| 2008/0317292 A1 | 12/2008 | Baker |
| 2009/0044687 A1 | 2/2009 | Sorber |
| 2009/0055426 A1 | 2/2009 | Kalasapur |
| 2009/0063414 A1 | 3/2009 | White |
| 2009/0164516 A1 | 6/2009 | Svendsen |
| 2009/0172538 A1 | 7/2009 | Bates |
| 2009/0222392 A1 | 9/2009 | Martin |
| 2009/0325602 A1 | 12/2009 | Higgins |
| 2009/0328087 A1 | 12/2009 | Higgins |
| 2011/0173539 A1 | 7/2011 | Rottler |
| 2011/0295843 A1 | 12/2011 | Ingrassia, Jr. |
| 2015/0154647 A1 | 6/2015 | Suwald |
| 2015/0281878 A1 | 10/2015 | Roundtree |
| 2017/0104824 A1 | 4/2017 | Bajwa |
| 2018/0091913 A1 | 3/2018 | Hartung |
| 2018/0158447 A1* | 6/2018 | Maziewski ............ G10L 13/033 |
| 2019/0228791 A1* | 7/2019 | Sun ......................... G10L 25/78 |
| 2021/0020162 A1* | 1/2021 | Griffin .................. G10L 15/063 |
| 2021/0097980 A1* | 4/2021 | Lezzoum .............. G10L 13/033 |

* cited by examiner

| Utterances | Quiet (<45dB) | 50dB | 60dB | 70dB | 80dB |
|---|---|---|---|---|---|
| Hey Spotify | ASR/TTS1A | ASR/TTS1B | ASR/TTS1C | ASR/TTS1D | ASR/TTS1E |
| Hey Spotify, Pause | ASR/TTS2A | ASR/TTS2B | ASR/TTS2C | ASR/TTS2D | ASR/TTS2E |
| Hey Spotify, Resume | ••• | | | | |
| Hey Spotify, Play Chill Beats Music | | | | | |
| Hey Spotify, Play Shallow by Lady Gaga | | | | | |
| Hey Spotify, Play The Beatles | | | | | |
| Hey Spotify, Play Discover Weekly | | | | | |
| Hey Spotify, Play Pink Floyd | | | | | |
| Hey Spotify, Play Peaceful Guitar | | | | | |
| Hey Spotify, Show Madonna | | | | | |
| Hey Spotify, Show Jazz | | | | | |
| Hey Spotify | ASR/TTSNA | ASR/TTSNB | ASR/TTSNC | ASR/TTSND | ASR/TTSNE |

*Fig. 9A*

TEXT-TO-SPEECH AND SPEECH RECOGNITION FOR NOISY ENVIRONMENTS

CROSS-REFERENCE TO RELATED APPLICATION(S)

This application claims priority to U.S. Application No. 63/133,101, filed on Dec. 31, 2020, the disclosure of which is hereby incorporated by reference in its entirety.

BACKGROUND

The use of digital assistants has become prolific. To converse with digital assistants or other machine interfaces, humans often have to speak into a device to provide a command. The digital assistants can then provide an output, which is often synthesized speech that is audibly presented from a speaker attached to the device. While communicating with machine interfaces is often straightforward, in noisy environments, it can be a challenge both to get the digital assistant to understand the command(s) and also to hear the response(s) from those digital assistants.

BRIEF DESCRIPTION OF THE FIGURES

The accompanying drawings, which are incorporated in and constitute a part of this disclosure, illustrate various example of the present disclosure. In the drawings:

FIG. 9A is a table of example test phrases that can be spoken to create the transform and/or different modified phrases that can be said by a Text-To-Speech (TTS) function in accordance with aspects of the present disclosure;

DETAILED DESCRIPTION

Figure 1:
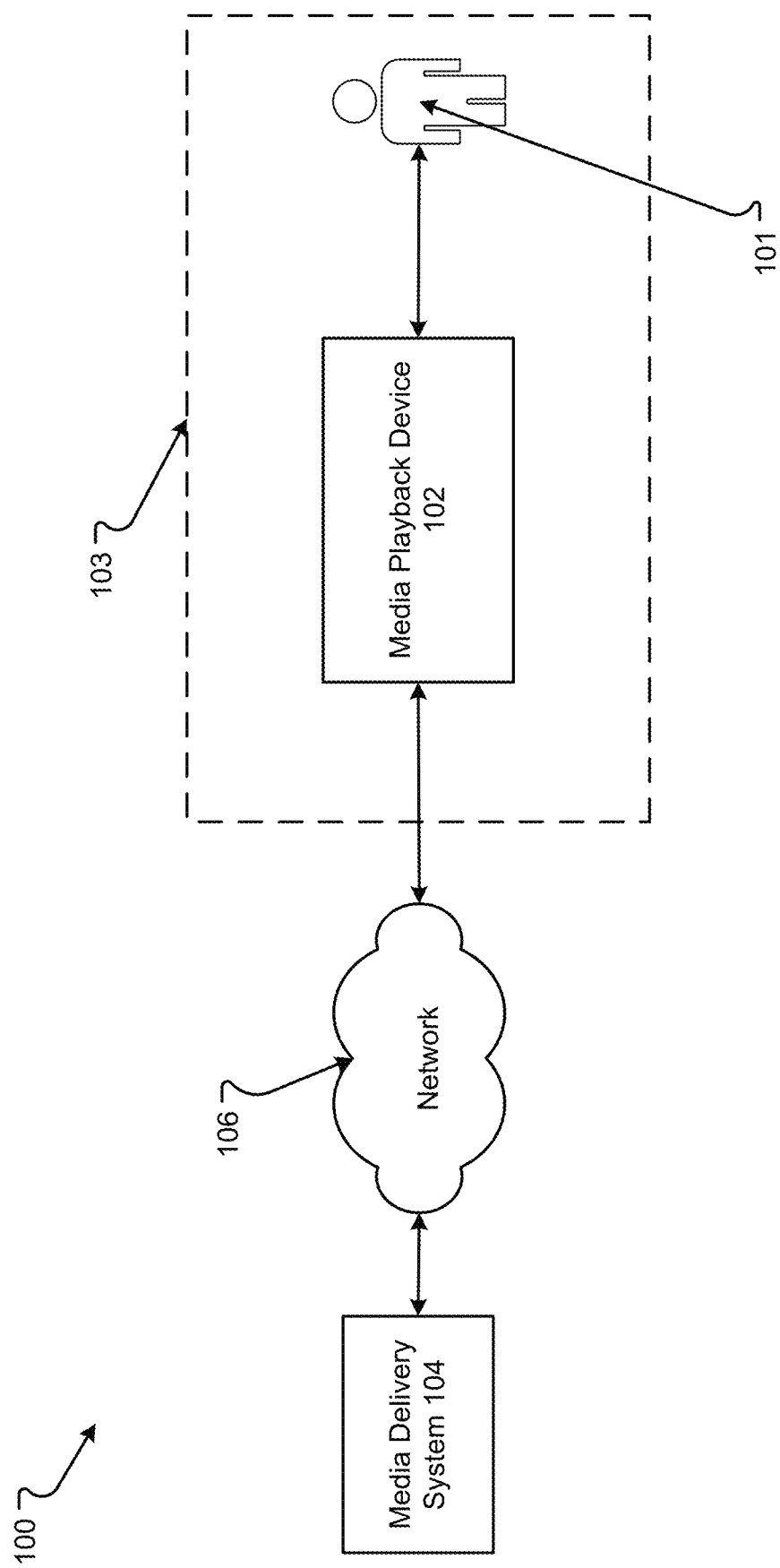
FIG. 1 is a block diagram of an environment for receiving speech input or providing speech output in accordance with aspects of the present disclosure.

The following examples are explanatory only, and should not be considered to restrict the disclosure's scope, as described and claimed. Furthermore, features and/or variations may be provided in addition to those described. For example, example(s) of the disclosure may be directed to various feature combinations and sub-combinations described in the example(s).

The following detailed description refers to the accompanying drawings. Wherever possible, the same reference numbers are used in the drawings and the following description to refer to the same or similar elements. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Both understanding speech and speaking clearly in a noisy environment is difficult. Humans reflexively change their speech patterns in noisy environments. This reaction to noise is called the Lombard reflex or Lombard effect. As explained by Wikipedia, the Lombard effect is an involuntary tendency of speakers to increase their vocal effort when speaking in loud noise to enhance the audibility of their voice. This vocal change includes not only adjustments to loudness but also other acoustic features such as pitch, rate, and duration of syllables. This compensation effect maintains the auditory signal-to-noise ratio of the speaker's spoken words.

Figure 7:
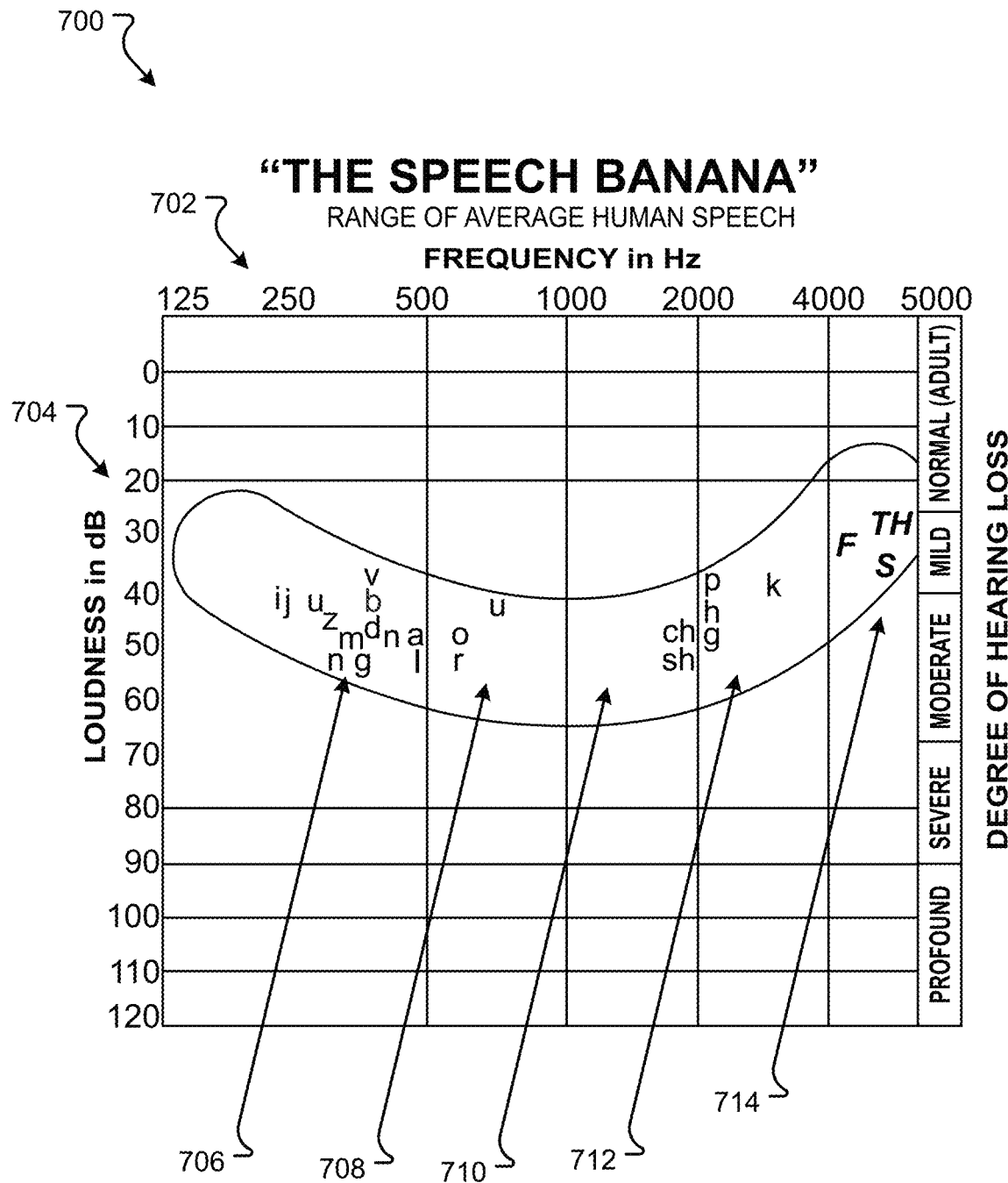
FIG. 7 is a chart graphing average frequency ranges for human speech in accordance with aspects of the present disclosure.
Figure 8A:
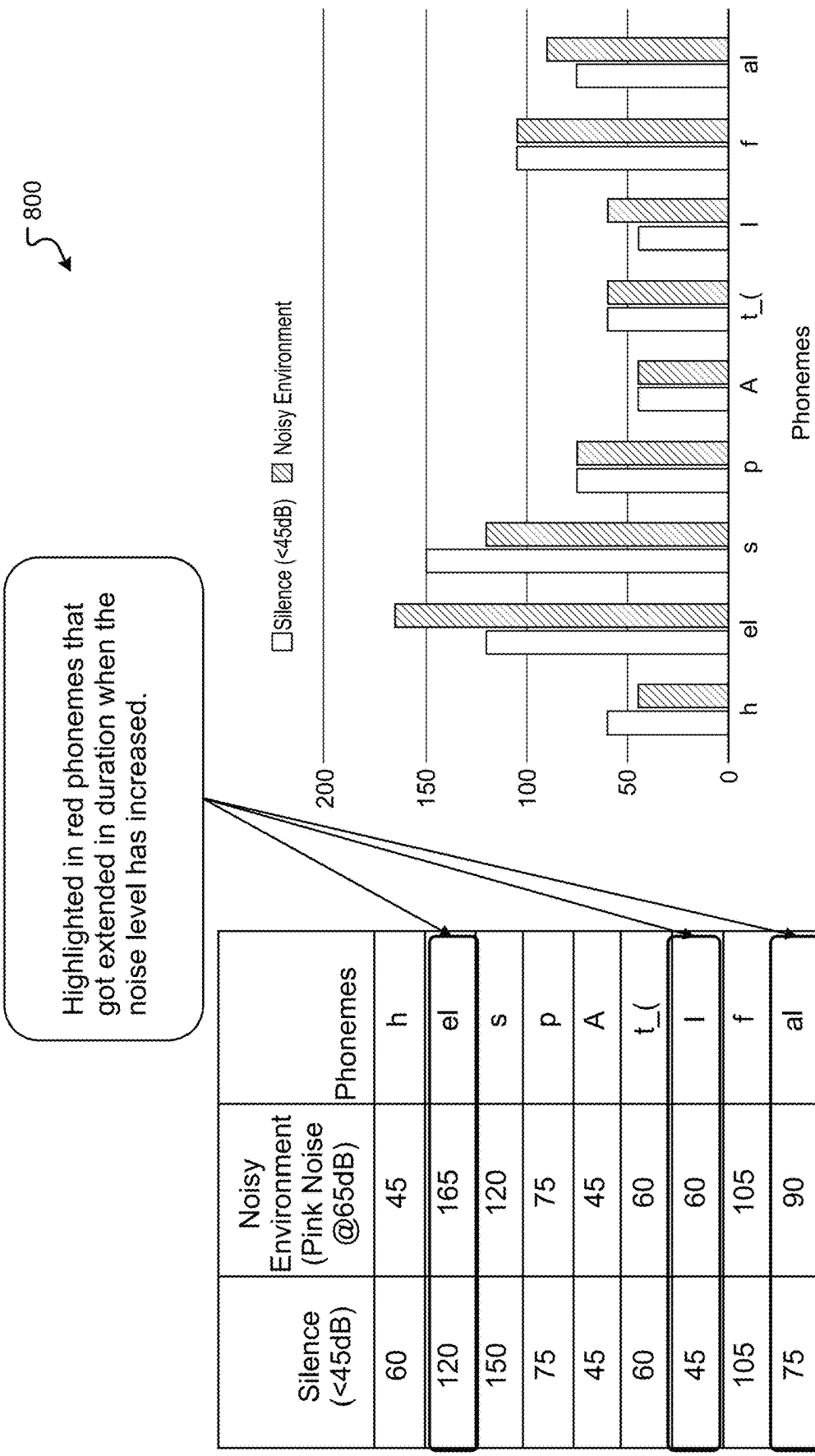
FIG. 8A is a chart graphing changes to a speech characteristic in different sound environments in accordance with aspects of the present disclosure.
Figure 8B:
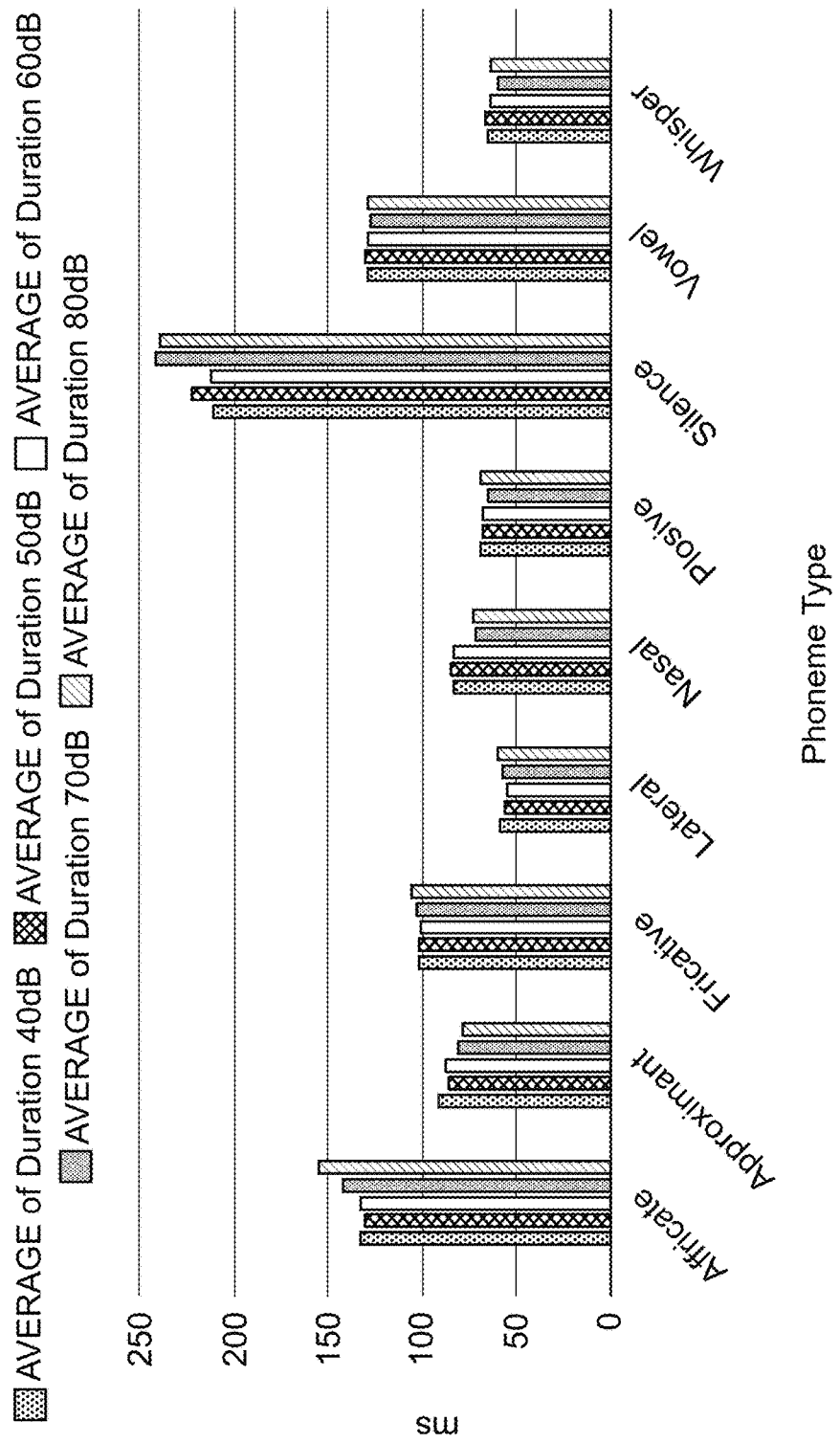
FIG. 8B is a chart graphing changes to a speech characteristic in different sound environments in accordance with aspects of the present disclosure.
Figure 8C:
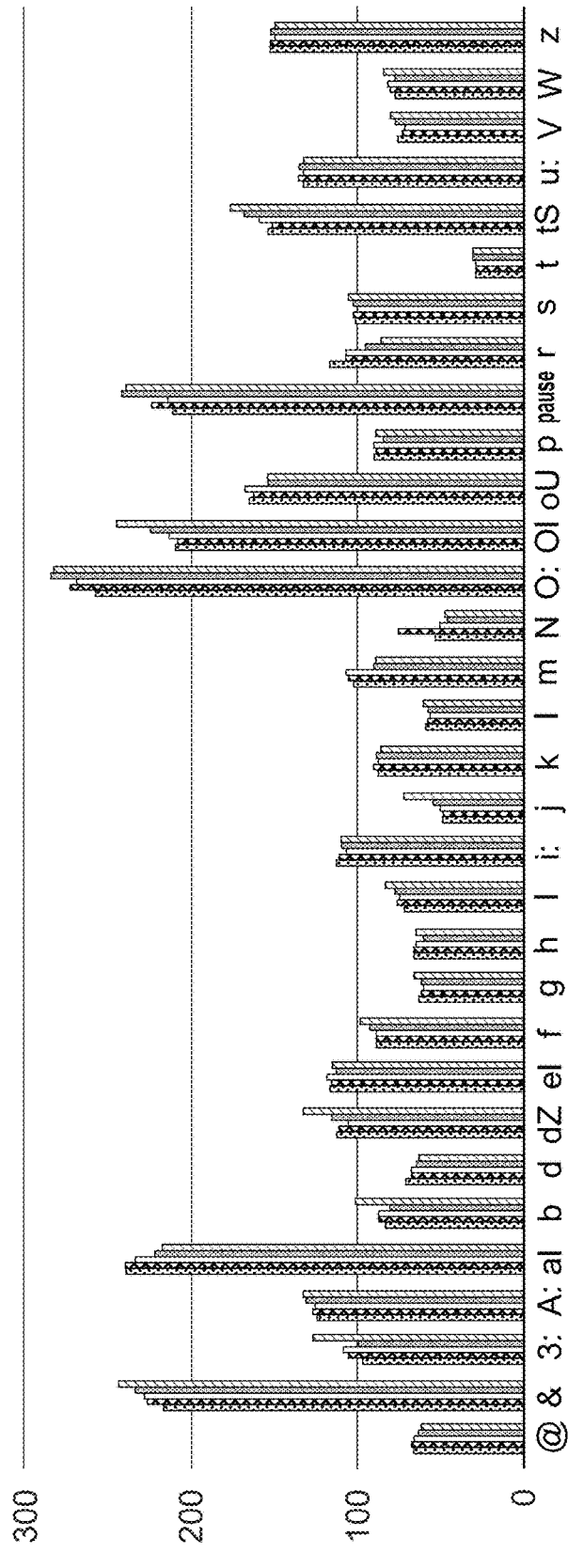
FIG. 8C is a chart graphing changes to a speech characteristic in different sound environments in accordance with aspects of the present disclosure.
Figure 8D:
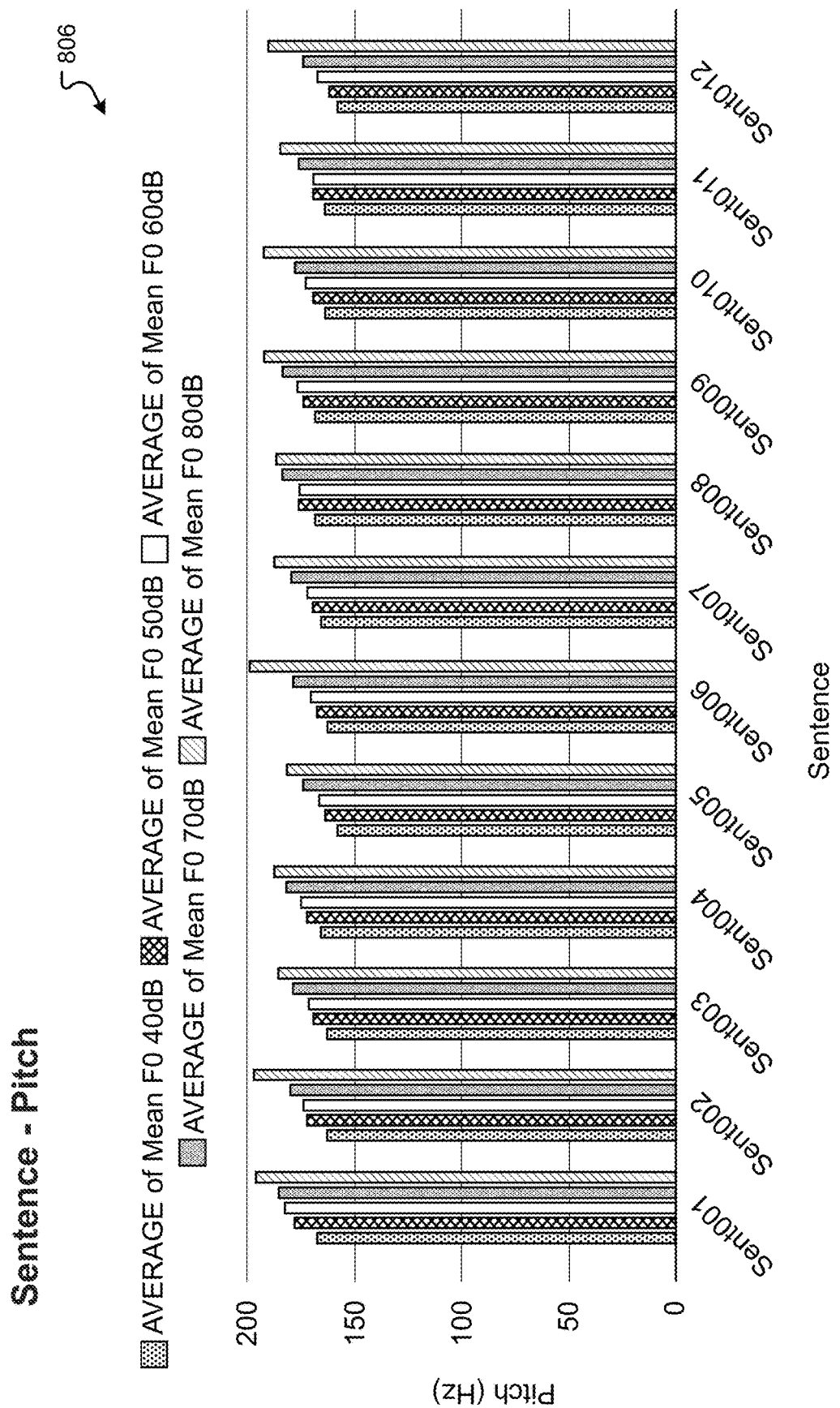
FIG. 8D is a chart graphing changes to a speech characteristic in different sound environments in accordance with aspects of the present disclosure.
Figure 8E:
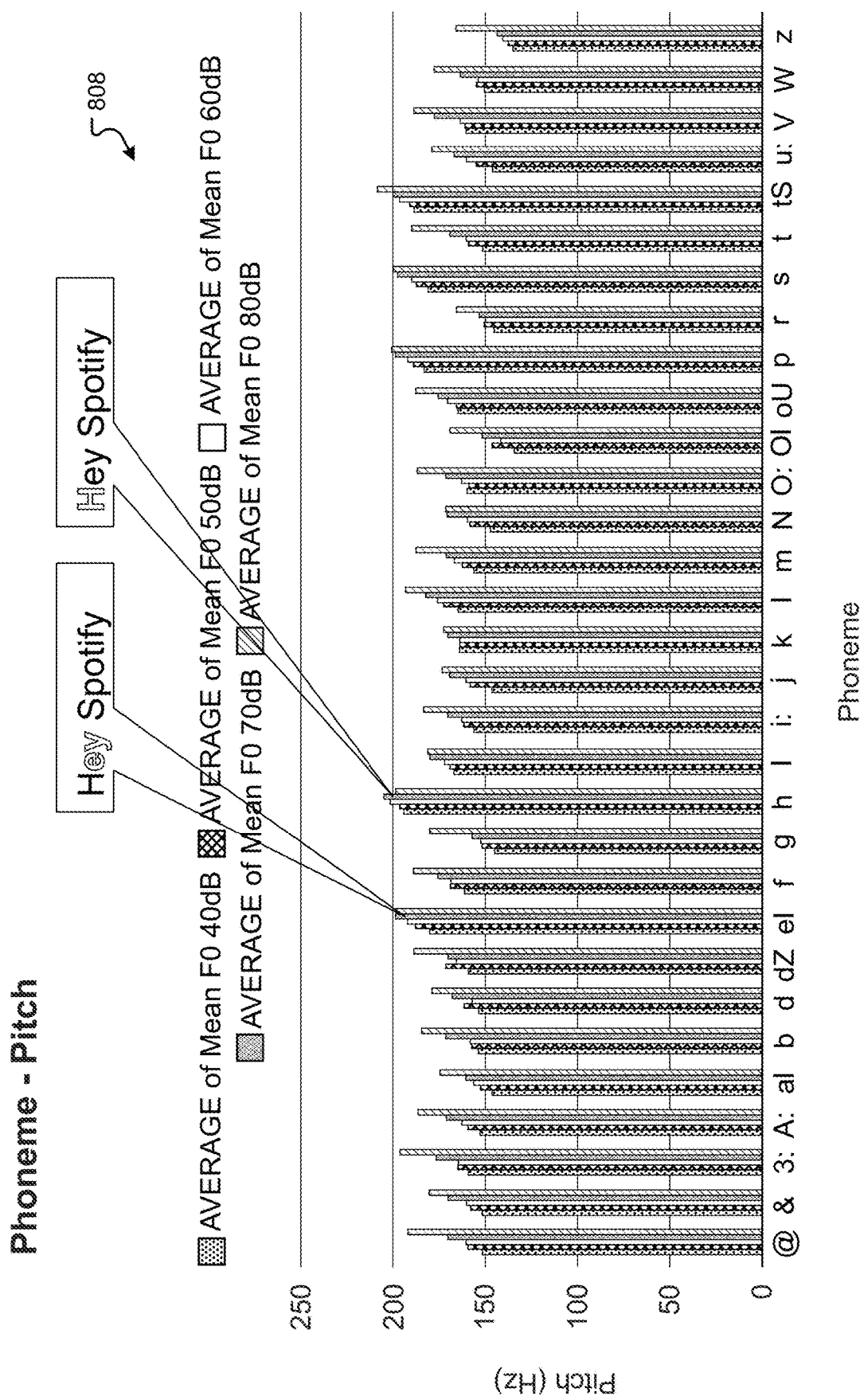
FIG. 8E is a chart graphing changes to a speech characteristic in different sound environments in accordance with aspects of the present disclosure.
Figure 8F:
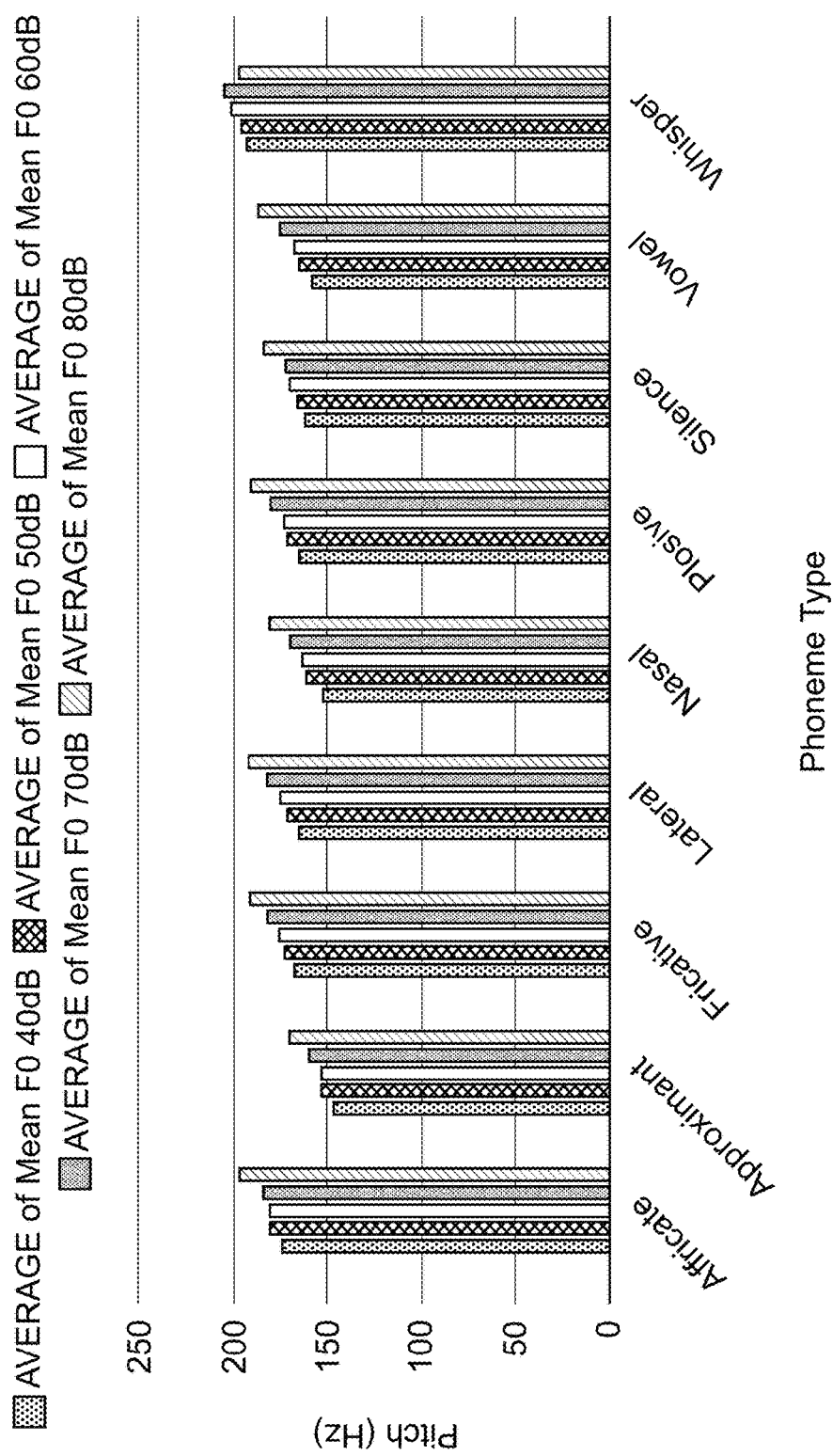
FIG. 8F is a chart graphing changes to a speech characteristic in different sound environments in accordance with aspects of the present disclosure.

Some example effects of the Lombard effect on human speech may be as shown in FIGS. 7-8F. FIG. 7 was obtained from Wikipedia under the topic, "Speech banana." Referring to FIG. 7, the phonemes of different speech in the English language, for example, fall at different frequency levels. As seen in chart 700, frequency is mapped on the x-axis 702 and the loudness, in decibels, is on the Y axis 704. Different loudness and frequency ranges for different phonemes are shown. For example, the group 714 may have high frequency and high loudness. Group 706 may have lower frequency and also increased loudness. In the other groups 708-712, the loudness and frequency levels are between groups 706 and 714. Thus, a sound environment 103 with greater low frequency sound or noise can affect phonemes in group 706 more than phonemes in group 714. Therefore, the changes to the speech may affect different phonemes differently depending on the level of sound or noise, frequency of the sound or noise, and type of sound environment 103. Herein, low frequency sound or noise may be less than 1 kHz, mid-range sound or noise may be 1 kHz to 4 kHz, and high frequency sound or noise may be above 4 kHz.

As shown in charts 800, 802, 804 in FIGS. 8A-8C, phonemes also may have a different duration (e.g., a longer duration) depending on which phoneme is being evaluated and the type of sound environment 103. For example, the "el" sound may have a longer duration change in noisy environments compared to the "f" sound, which may not change in noisy environments. The charts 800-804 show several phonemes and the changes that occur to the sounds, which may speed up or slow down, in noisy environments.

As shown in chart 806 in FIG. 8D, the loudness of various phonemes or words increases as the sound environment 103 becomes noisier. For example, the loudness of sent001 is less at a noise level 40 dB compared to 80 dB. This increase in loudness ensures the speech can be heard over the noise.

As shown in chart 808 in FIGS. 8E and 8F, the pitch of various phonemes increases as the sound environment 103 becomes noisier. For example, the "el" sound may have a higher pitch in noisy environments. The "f" sound may also have a higher pitch in noisy environments. The charts 808 and 810 shows several phonemes (or phoneme types) and the changes in pitch that occur to the phoneme sounds, which may increase, in noisy environments.

Figure 10A:
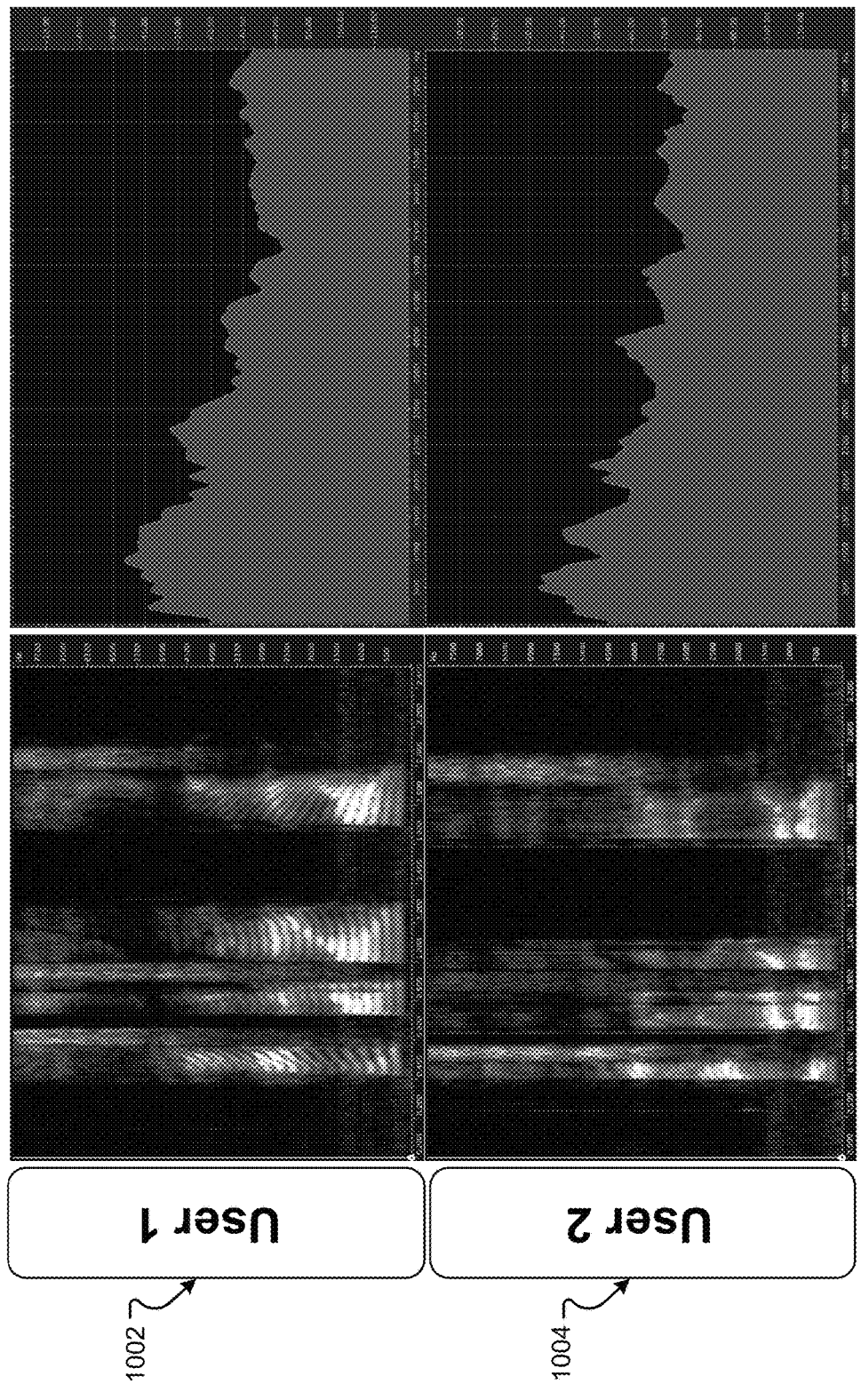
FIG. 10A is a frequency spectrum analysis chart of voices in accordance with aspects of the present disclosure.

The charts 1000, 1006, 1012, and 1022, in FIGS. 10A through 10D, show the differences both between different user's voices and the effects of low frequency wind noise on pronunciations for different users saying of the same phrase. For example, the graph or chart in FIG. 10A shows a frequency spectrum comparison between the a first user 1002 and a second user 1004 saying the same phrase. As shown in the chart 1000, the first user 1002 has a higher frequency voice towards the top of the chart, while the second user 1004 has a lower frequency voice at the bottom of the chart. Therefore, in low frequency noise environments, the voice of the second user is more likely to be obscured.

Figure 10B:
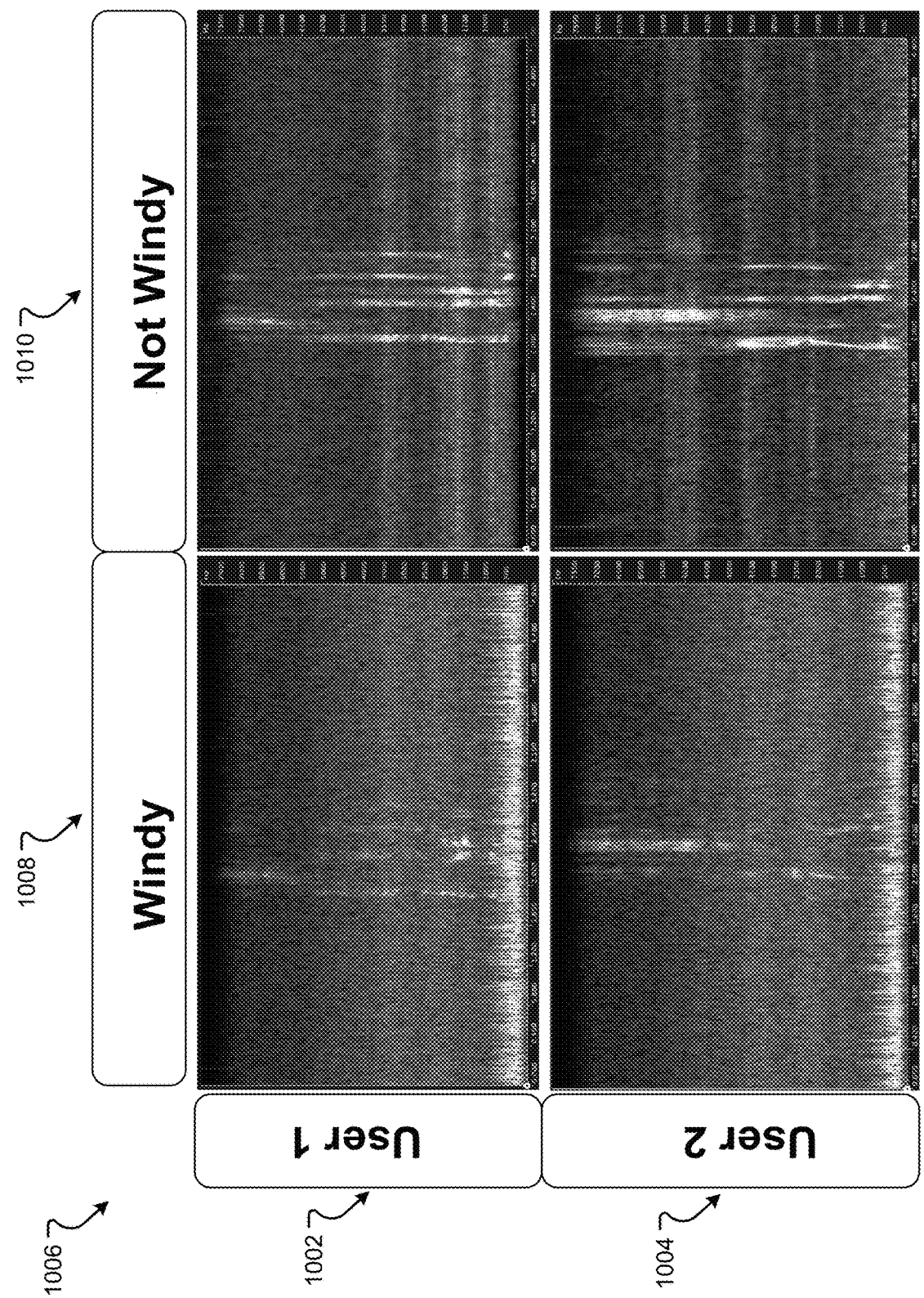
FIG. 10B is another frequency spectrum analysis chart of voices in accordance with aspects of the present disclosure.

This obfuscation is evident from the frequency spectrum chart 1006, shown in FIG. 10B. Chart 1006 shows the first user 1002, in a windy environment 1008 (compared to the quiet environment 1010), can still be heard better than the second user 1004 shown in the same windy environment 1008. As such, the treatment of the voice of the first or second user may be different. The metadata 306, in the transform data structure 300, may store the frequency range of the voice of the user 101, and there may be two or more transforms 304, for the same sound environment profile 302, based on the frequency range of the voice of the user 101 or other types of metadata.

Figure 10C:
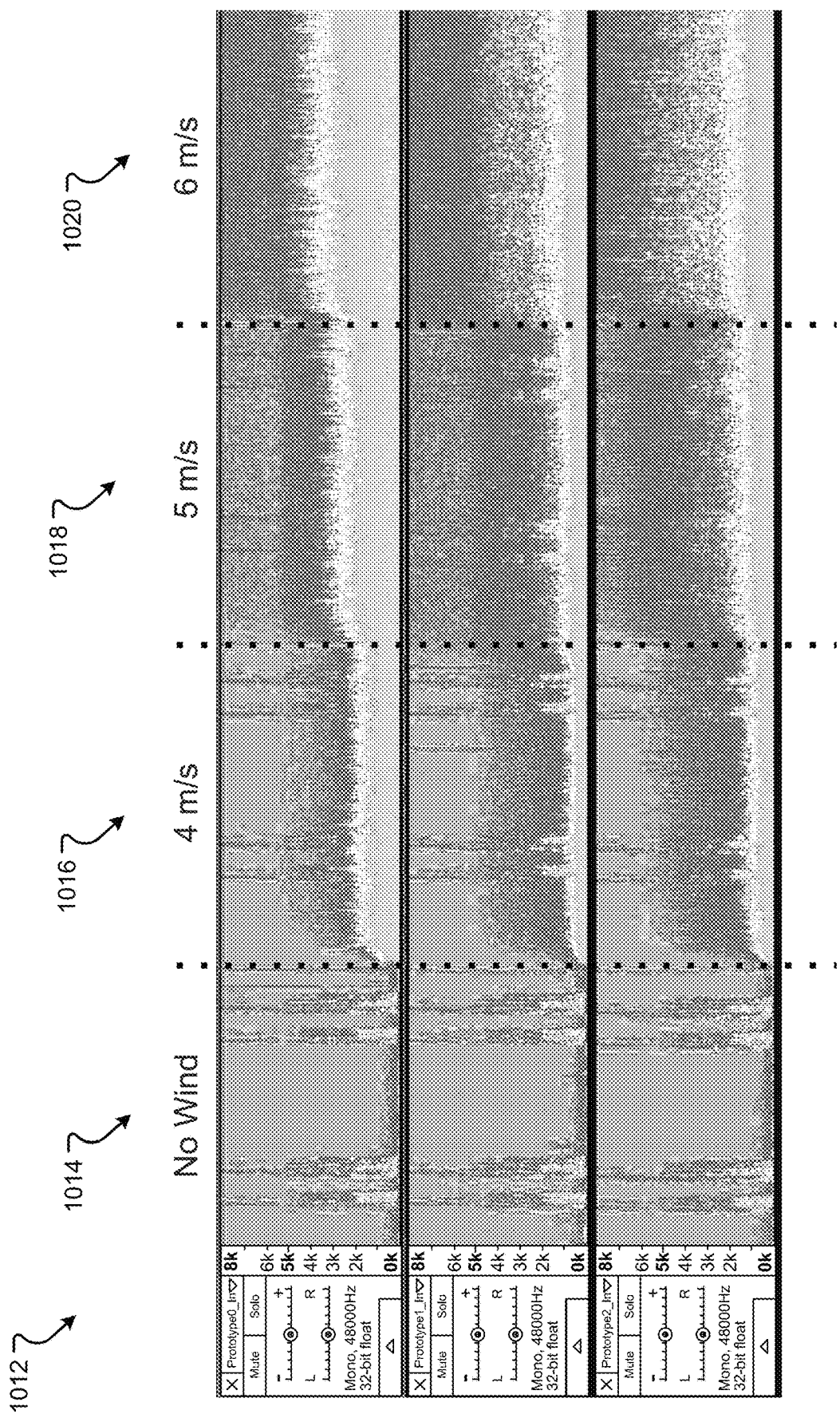
FIG. 10C is another frequency spectrum analysis chart of voices in accordance with aspects of the present disclosure.
Figure 10D:
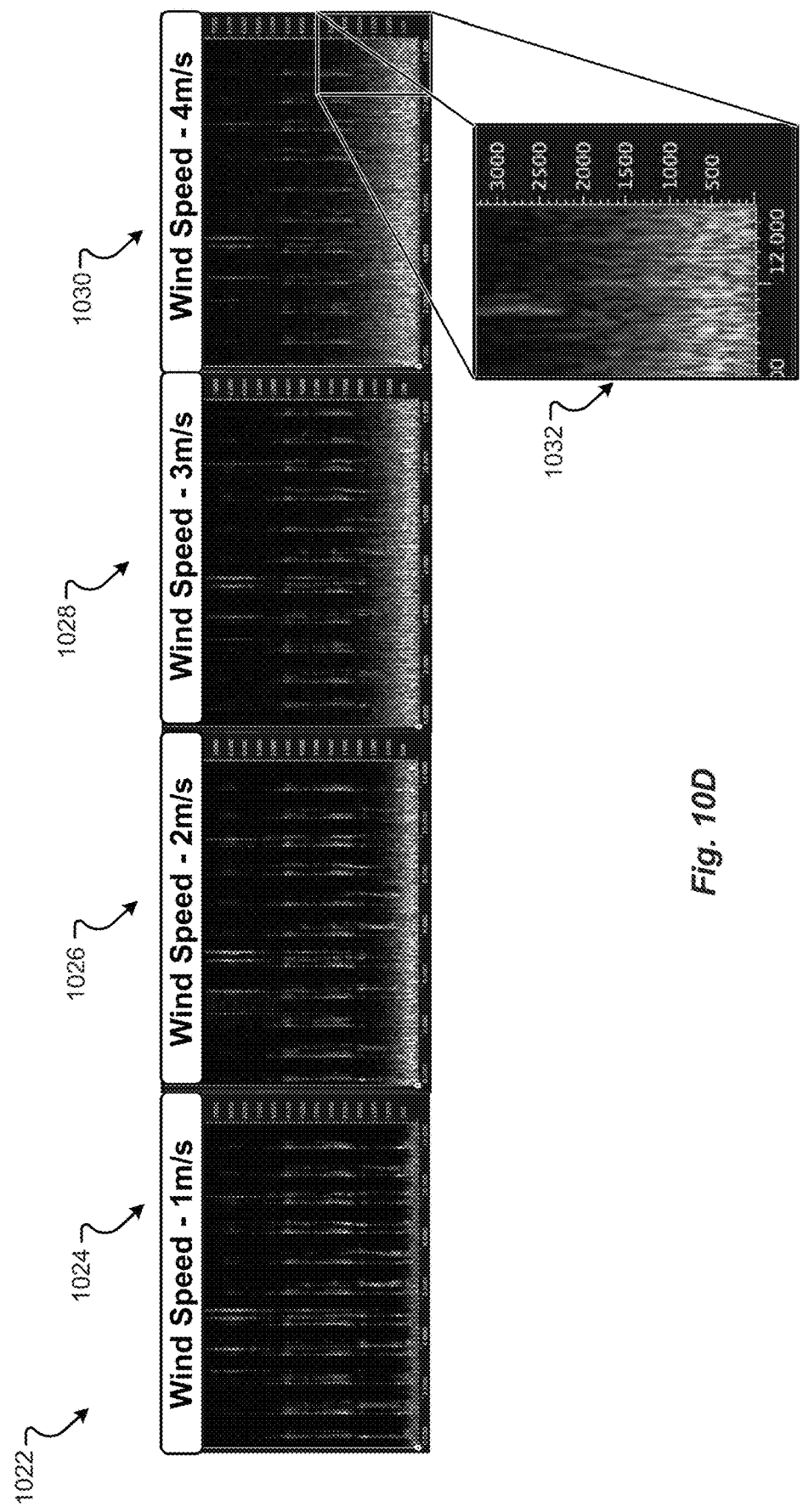
FIG. 10D is another frequency spectrum analysis chart of voices in accordance with aspects of the present disclosure.

Further, the amount of interference changes based on the amount of wind, for example, as shown in charts 1012, 1022 of FIGS. 10C and 10D. The frequency spectrum display of the same phrase shown previously in FIGS. 10A and 10B can be clearly seen without wind, as shown in column 1014. As the wind increases up to 4 m/s, the frequency range is partially obscured, as shown in column 1016 and as shown in columns 1024, 1026, 1028, and 1030, including blow-up section 1032, and more obscured, as shown in columns 1018 and 1020, as the wind continues to increase to 5 m/s and 6 m/s, respectively.

These various changes to the speech patterns can be considered when both receiving speech as user input and when providing speech as output to the user. If the device does not adjust to the noise level of the environment, the user may not be understood or understand the interaction with the device. Thus, configurations and implementations herein compensate for the noise level of the environment by adjusting to or for the Lombard effect.

An environment 100 for receiving or providing speech input and/or output may be as shown in FIG. 1. The environment 100 can include a sound environment 103. The sound environment 103 includes the user 101, which may provide speech input to a user device, e.g., a media-playback device 102. Further, the media-playback device 102 can provide speech output to the user 101. The sound environment 103 may be simulated or may be real and physical, as being experienced by the user 101.

Different types of sound environments 103 can include a test environment where the user may be provided with a set of headphones that play different types of sounds or noise. For example, headphones can play a quiet environment, with little to no noise, for example, a noise level at or under 45 dB. In other situations, the test environment can provide a pink noise environment, with noise at 50 dB, or even noisier environments, with noise or sounds at decibel ranges above 50 dB. Also, the noise in the test environment can be changed or recorded to evaluate different speech input patterns and changes from the user 101 at different noise levels.

Figure 2A:
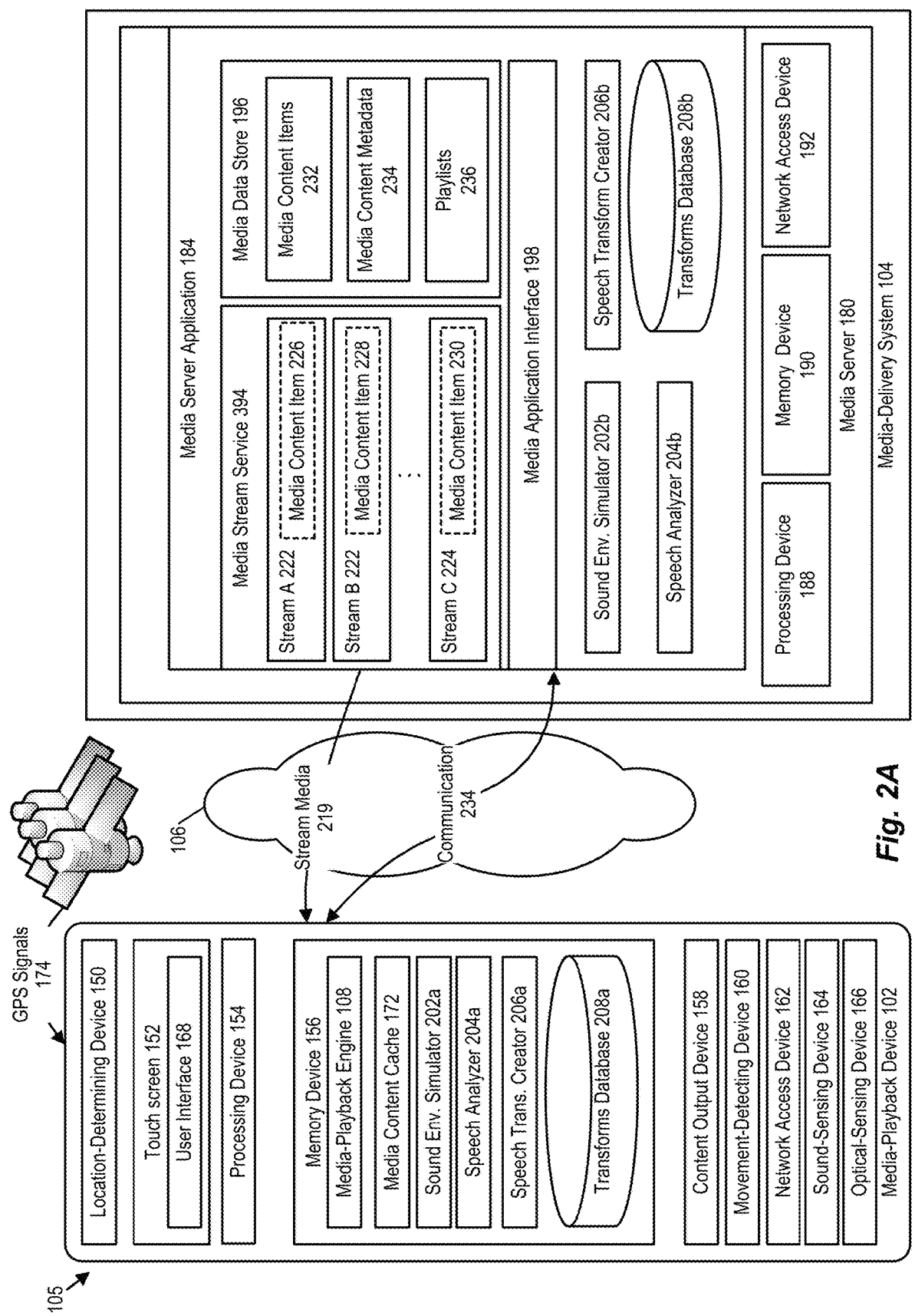
FIG. 2A is a block diagram of a media-playback device and a media-delivery system for receiving speech input or providing speech output in accordance with aspects of the present disclosure.
Figure 2B:
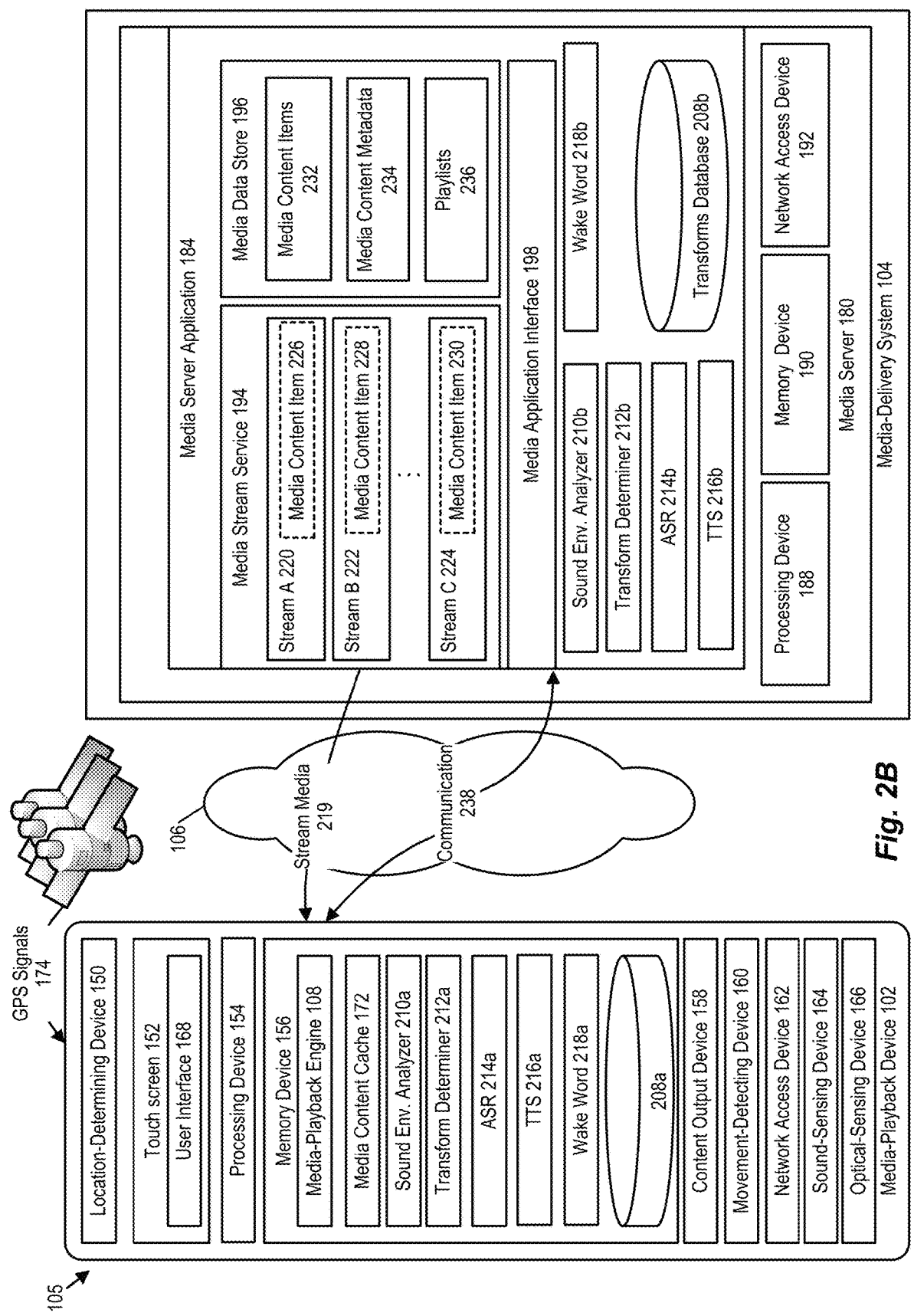
FIG. 2B is another block diagram of the media-playback device and the media-delivery system for receiving speech input or providing speech output in accordance with aspects of the present disclosure.

FIGS. 2A and 2B illustrate implementations of an example system 105 for interaction with a user. For example, the media-playback system 105 can function for media content playback. The example system 105 includes a media-playback device 102 and a media-delivery system 104. The media-playback device 102 includes a media-playback engine 108. The system 105 communicates across a network 106.

The media-playback device 102 can play back media content items to produce media output or perform other actions, including, but not limited to, reading text (e.g., audio books, text messages, content from a network, for example, the Internet, etc.), ordering products or services, interacting with other computing systems or software, etc. The output from these various actions is considered media content. While the in some implementations, media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, text, spoken media, etc., and portions or combinations thereof.

The media-playback device 102 plays media content for the user. The media content that is played back may be selected based on user input or may be selected without user input. The media content may be selected for playback without user input by either the media-playback device 102 or the media-delivery system 104. For example, media content can be selected for playback without user input based on stored user profile information, location, travel conditions, current events, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 1, the media-playback device 102 can also be integrated with another device or system, e.g., a vehicle (e.g., as part of a dash-mounted vehicle infotainment system).

The media-playback engine 108 generates interfaces for selecting and playing back media content items. In at least some implementations, the media-playback engine 108 generates interfaces that are configured to be less distracting to a user and require less attention from the user than a standard interface. Implementations of the media-playback engine 108 are illustrated and described further throughout.

FIGS. 2A and 2B are schematic illustrations of an example system 105 for media content playback. In FIGS. 1, 2A and 2B, the media-playback device 102, the media-delivery system 104, and the network 106 are shown. Also shown are the user 101, the sound environment 103, and satellites.

As noted above, the media-playback device 102 plays media content items. In some implementations, the media-playback device 102 plays media content items that are provided (e.g., streamed, transmitted, etc.) by a system external to the media-playback device 102, for example, the media-delivery system 104, another system, or a peer device. Alternatively, in some implementations, the media-playback device 102 plays media content items stored locally on the media-playback device 102. Further, in at least some implementations, the media-playback device 102 plays media content items that are stored locally and media content items provided by other systems.

In some implementations, the media-playback device 102 is a computing device, handheld entertainment device, smartphone, tablet, watch, wearable device, or any other type of device capable of playing media content. In yet other implementations, the media-playback device 102 is an in-dash vehicle computer, laptop computer, desktop computer, television, gaming console, set-top box, network appliance, blue-ray or DVD player, media player, stereo, radio, smart home device, digital assistant device, etc.

In at least some implementations, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other implementations may include additional, different, or fewer components. For example, some implementations do not include one or more of the location-determining device 150, the touch screen 152, the sound-sensing device 164, and the optical-sensing device 166.

The location-determining device 150 is a device that determines the location of the media-playback device 102. In some implementations, the location-determining device 150 uses one or more of the following technologies: Global Positioning System (GPS) technology which may receive GPS signals 174 from satellites, cellular triangulation technology, network-based location identification technology, Wi-Fi positioning systems technology, and combinations thereof.

The touch screen 152 operates to receive an input from a selector (e.g., a finger, stylus, etc.) controlled by the user 101. In some implementations, the touch screen 152 operates as both a display device and a user input device. In some implementations, the touch screen 152 detects inputs based on one or both of touches and near-touches. In some implementations, the touch screen 152 displays a user interface 168 for interacting with the media-playback device 102. As noted above, some implementations do not include a touch screen 152. Some implementations include a display device and one or more separate user interface devices. Further, some implementations do not include a display device.

In some implementations, the processing device 154 comprises one or more central processing units (CPU). In other implementations, the processing device 154 additionally or alternatively includes one or more digital signal processors (DSPs), field-programmable gate arrays (FPGAs), Application Specific Integrated Circuits (ASICs), system-on-chips (SOCs), or other electronic circuits.

The memory device 156 operates to store data and instructions. In some implementations, the memory device 156 stores instructions for a media-playback engine 170 that includes the media-playback engine 108. In some implementations, the media-playback engine 170 selects and plays back media content and generates interfaces for selecting and playing back media content items. As described above, the media-playback engine 108 also generates interfaces for selecting and playing back media content items.

In at least some implementations, the media-playback engine 108 generates interfaces that are configured to be less distracting to a user and require less attention from the user than other interfaces generated by the media-playback engine 170. For example, interface(s) generated by the media-playback engine 108 may include fewer features than the other interfaces generated by the media-playback engine 170. These interfaces generated by the media-playback engine 108 may make it easier for the user to interact with the media-playback device 102 during travel or other activities that require the user's attention.

Some implementations of the memory device also include a media content cache 172. The media content cache 172 stores media content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback).

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, Random Access Memory (RAM), Read Only Memory (ROM), Electrically Erasable Programmable Read Only Memory (EEPROM), flash memory and other memory technology, Compact Disc-Read Only Memory (CD-ROM), blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some implementations, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some implementations, the content output device 158 generates media output for the user 101 that is directed into a sound environment 103, for example, an interior cabin of the vehicle. Examples of the content output device 158 include a speaker assembly comprising one or more speakers, an audio output jack, a Bluetooth transmitter, a display panel, and a video output jack. Other implementations are possible as well. For example, the content output device 158 may transmit a signal through the audio output jack or Bluetooth transmitter that can be used to reproduce an audio signal by a connected or paired device such as headphones, speaker system, vehicle head unit, etc.

The movement-detecting device 160 senses movement of the media-playback device 102. In some implementations, the movement-detecting device 160 also determines an orientation of the media-playback device 102. In at least some implementations, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret those acceleration as indicating movement of the media-playback device 102 too.

The network access device 162 operates to communicate with other computing devices over one or more networks, such as the network 106. Examples of the network access device include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media-playback device 102, the media-delivery system 104, or other devices or systems. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various implementations, the network 106 includes various types of links. For example, the network 106 can include wired and/or wireless links, including Bluetooth, ultra-wideband (UWB), 802.11, ZigBee, cellular, and other types of wireless links. Furthermore, in various implementations, the network 106 is implemented at various scales. For example, the network 106 can be implemented as one or more vehicle are networks, Local Area Networks (LANs), metropolitan area networks, subnets, Wide Area Networks (WANs) (such as the Internet), or can be implemented at another scale. Further, in some implementations, the network 106 includes multiple networks, which may be of the same type or of multiple different types.

The sound-sensing device 164 senses sounds proximate the media-playback device 102 (e.g., sounds within a vehicle in which the media-playback device 102 is located). In some implementations, the sound-sensing device 164 comprises one or more microphones. For example, the sound-sensing device 164 may capture a recording of sounds from proximate the media-playback device 102. These recordings may be analyzed by the media-playback device 102 using speech-recognition technology, e.g., the ASR 214, to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words.

Additionally or alternatively, the sound-sensing device 164 may determine various sound properties about the sound environment 103 physical proximate the user such as loudness (volume), dominant frequency or frequencies, duration of sounds, pitch, etc. The sound-sensing device 164 may receive sound in frequencies beyond human hearing, e.g., frequencies below or above human capable hearing. Further, the sound-sensing device 164 may record sound at loudness levels at the full range of the microphones, e.g., 0 dB to 120 dB. In implementations, the sound-sensing device 164 can record sound pressure levels using dB(A) and dB(C). dB(A) is a family of curves defined in various standards that relates to the weighted measurement of sound pressure level at sound levels perceived by the human ear, e.g., weightings more heavily placed from 1 to 4 kHz. dB(C) is also a frequency weighting, but the weightings are applied more evenly over the entire frequency range, e.g., from 30 Hz to 8 kHz, which includes frequencies above and below that perceived by the human ear. These two sound pressure measurements, dB(A) and dB(C), can characterize a sound environment for loudness over various frequencies.

These sound properties may be used to make inferences about the sound environment 103 proximate to the media-playback device 102, such as the amount or type of ambient sound and/or background noise in the sound environment 103, whether the sensed sounds are likely to correspond to types of environments that will cause human listeners trouble hearing the device or cause the human to apply the Lombard effect. In some implementations, recordings captured by the sound-sensing device 164 are transmitted to the media-delivery system 104 (or another external server) for analysis using speech-recognition and/or intent-recognition technologies.

The optical-sensing device 166 senses optical signals proximate the media-playback device 102. In some implementations, the optical-sensing device 166 comprises one or more light sensors or cameras. For example, the optical-sensing device 166 may capture images or videos. The captured images can be processed (by the media-playback device 102 or an external server, for example, the media-delivery system 104 to which the images are transmitted) to detect gestures, which may then be interpreted as commands to change the playback of media content, or to determine or receive other information.

Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some implementations, other media-playback devices as well. The media-delivery system 104 can also include a media server 180. Although FIGS. 2A and 2B show a single media server 180, some implementations include multiple media servers. In these implementations, each of the multiple media servers may be identical or similar and may provide similar functionality (e.g., to provide greater capacity and redundancy, or to provide services from multiple geographic locations). Alternatively, in these implementations, some of the multiple media servers 180 may perform specialized functions to provide specialized services (e.g., services to enhance media content playback, to analyze spoken messages from the user 101, to synthesize speech, etc.). Various combinations thereof are possible as well.

The media server 180 transmits stream media 219 to media-playback devices such as the media-playback device 102. In some implementations, the media server 180 includes a media server application 184, a processing device 188, a memory device 190, and a network access device 192. The processing device 188, memory device 190, and network access device 192 may be similar to the processing device 154, memory device 156, and network access device 162 respectively, which have each been previously described.

In some implementations, the media server application 184 streams audio, video, or other forms of media content. The media server application 184 includes a media stream service 194, a media data store 196, and a media application interface 198. The media stream service 194 operates to buffer media content such as media content items 226, 228, and 230, for streaming to one or more streams 220, 222, and 224.

The media application interface 198 can receive requests or other communication from media-playback devices or other systems, to retrieve media content items from the media server 180. For example, in FIGS. 2A and 2B, the media application interface 198 receives communication 238 from the media-playback engine 170.

In some implementations, the media data store 196 stores media content items 232, media content metadata 234, and playlists 236. The media data store 196 may comprise one or more databases and file systems. As noted above, the media content items 232 may be audio, video, or any other type of media content, which may be stored in any format for storing media content.

The media content metadata 234 operates to provide various information associated with the media content items 232. In some implementations, the media content metadata 234 includes one or more of title, artist name, album name, length, genre, mood, era, etc. The playlists 236 operate to identify one or more of the media content items 232 and. In some implementations, the playlists 236 identify a group of the media content items 232 in a particular order. In other implementations, the playlists 236 merely identify a group of the media content items 232 without specifying a particular order. Some, but not necessarily all, of the media content items 232 included in a particular one of the playlists 236 are associated with a common characteristic such as a common genre, mood, or era. The playlists 236 may include user-created playlists, which may be available to a particular user, a group of users, or to the public.

Each of the media-playback device 102 and the media-delivery system 104 can include additional physical computer or hardware resources. In at least some implementations, the media-playback device 102 communicates with the media-delivery system 104 via the network 106.

Although in FIGS. 2A and 2B, only a single media-playback device 102 and media-delivery system 104 are shown, in accordance with some implementations, the media-delivery system 104 can support the simultaneous use of multiple media-playback devices, and the media-playback device can simultaneously access media content from multiple media-delivery systems. Additionally, although FIGS. 2A and 2B illustrate a streaming media based system for media playback during travel, other implementations are possible as well. For example, in some implementations, the media-playback device 102 includes a media data store 196 and the media-playback device 102 is configured to select and playback media content items without accessing the media-delivery system 104. Further in some implementations, the media-playback device 102 operates to store previously streamed media content items in a local media data store (e.g., the media content cache 172).

In at least some implementations, the media-delivery system 104 can be used to stream, progressively download, or otherwise communicate music, other audio, video, or other forms of media content items to the media-playback device 102 for playback during travel on the media-playback device 102. In accordance with an implementation, a user 101 can direct the input to the user interface 168 to issue requests, for example, to playback media content for playback during travel on the media-playback device 102.

Components that may be part of the media-playback device 102 and/or the media-delivery system 104 may be as shown in FIGS. 2A and 2B. The components shown FIGS. 2A and 2B can include one or more of, but are not limited to, a sound environment simulator 202a, 202b, a speech analyzer 204a, 204b, a speech transform creator 206a, 206b, and/or a transforms database 208a, 208b. The components shown in FIGS. 2A and 2B may be provided to create one or more transforms to transform the speech input or output into or out of the media-playback device 102. Either the media-delivery system 104 or the media-playback device 102 may perform the functions described herein in conjunction with the components 202-208.

The sound environment simulator 202 can provide or simulate a sound environment to the user 101. The sound environment simulator 202 can simulate different types of sound environments that may be encountered by the user 101. For example, as the user 101 is often in the car, the sound environment simulated, by the sound environment simulator 202, can include wind noise, tire harm, radio playback, etc. One or more these different environmental conditions may be applied to a sound environment 103 for the user 101. The sound environment 103 can be provided to the user 101 through headphones or some other device. In this way, the simulation of the sound environment 103 can force or cause the Lombard Reflex from the user 101, when the user speaks one or more different tests phrases.

For example, referring to FIG. 9, a table 900 of different tests phrases, for example, phrases 902a-902c, may be spoken by the user 101, when being subject to the conditions of the test sound environment 103 from the sound environment simulator 202. Receiving the test phrases 902a-902c, under different noise environments, allows the media-playback device 102 or the media-delivery system 104 to determine different changes in the speech of the user based on the sound environment 103. These spoken tests phrases 902 can be received by the Automatic Speech Recognition (ASR) 214 and provided to the speech analyzer 204 by the sound-sensing device 164.

The speech analyzer 204 can evaluate the different types of speech patterns that occur in the test phrases 902 when the sound environment (e.g., noise) is changed. For example, speech analyzer 204 can record changes in the speed of different phonemes or morphemes, the duration of phonemes or morphemes, the pitch differences of phonemes or morphemes, changes in the forms of phonemes or morphemes, changes in silence between the phonemes, changes in syntax, grammar, or other speech characteristics. Speech analyzer 204 can analyze these different changes by, for example, first having the sound environment simulator 202 provide a quiet environment to the user 101. Then, by simulating noisy conditions (e.g., pink noise, moving car sounds, crowds, dogs barking, children screaming, crowd noises, etc.), the speech analyzer 204 can recognize different changes in speech patterns within the user's speech. These different types of changes are provided to the speech transform creator 206.

The speech transform creator 206 can evaluate the changes in speech to create a transform data structure 300 associated with the simulated sound environment. Thus, for different types of sound environments, for example, a car, a mall, a bar, noise in a user's home, etc., the speech transform creator 206 can create a sound environment profile. With an associated sound environment profile, the speech transform creator 206 can also create a transform based on the changes provided by the speech analyzer 204 that indicate how the user changes their speech based on the noise or changes in the sound environment 103. This transform can be applied to speech being presented to the user 101 from the media-playback device 102 or can be used to interpret different messages or input from the user 101 into the media-playback device 102. These transforms are stored in a transforms database 208.

Figure 3:
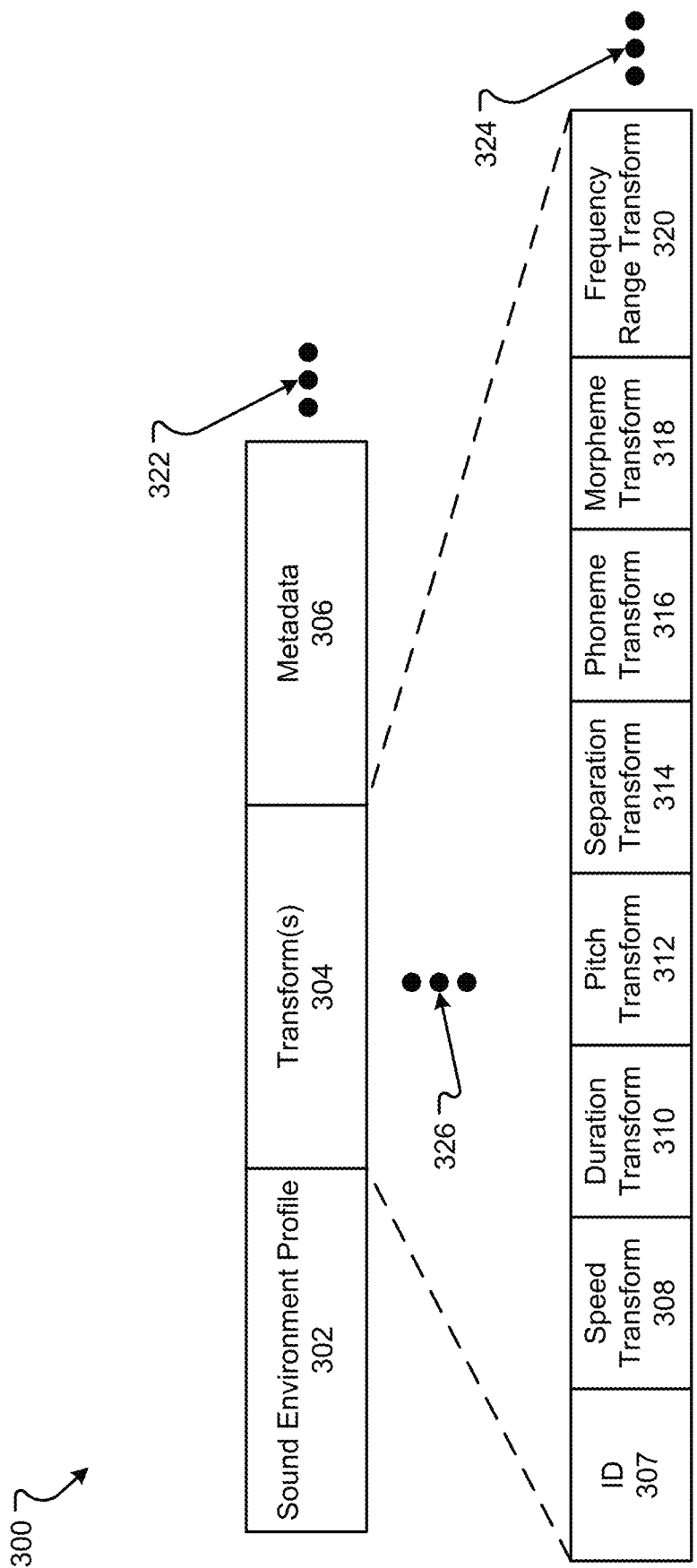
FIG. 3 is a block diagram of a transform in accordance with aspects of the present disclosure.

The transforms database 208 can be any type of database (e.g., flat-file databases, relational database, etc.) or data-store for storing the transform data. An example of the data structures 300 that may be stored in the transforms database 208 208 along with the different types of characteristics that might be evaluated or indicated in the transforms may be as shown in FIG. 3.

Another implementation of the media-playback device 102 and the media-delivery system 104 may be as shown in FIG. 2B. With these implementations of the media-playback device 102 and the media-delivery system 104, the transforms may be applied to outgoing speech or applied to reduce errors in interpreting speech received from the user 101. The implementation shown in FIG. 2B can include one or more of, but is not limited to, a sound environment analyzer 210a, 210b, a transform determiner 212a, 212b, an Automatic Speech Recognition (ASR) component 214a, 214b, a Text-To-Speech (TTS) component 216a, 216b, a wake word function 218a, 218b, and the transforms database/look-up table 208a, 208b.

The sound environment analyzer 210a can receive information about the sound environment 103 being experienced by the user 101. In implementations, the sound environment analyzer 210a can determine sound pressure levels using dB(A) and/or dB(C). This sound information may include a recording of the background noise from the media-playback device 102, which may be analyzed either at the media-playback device 102 or the media-delivery system 104. The different levels of loudness in decibels, the different frequency ranges of the sound that is being heard, and/or other acoustic characteristics may be determined. The sound environment analyzer 210 can then produce a sound environment profile (e.g., in dB(A) and/or dB(C)) that may be compared to the sound environment profile 302 stored in the transforms database 208.

The determination of a matching sound environment profile to the sound environment 103, by the sound environment analyzer 210a, can provide information to the transform determiner 212 to determine which transform to be applied. The transform determiner 212 may access the transforms database 208 to determine and retrieve a transform data structure 300 that may be applied to the operation being performed. The transform data structure 300 may be retrieved and then sent to one of the components 214 through 218.

The ASR 214 can recognize speech input from the user into the media-playback device 102. The speech may be provided in a noisy environment. As such, the ASR 214 can receive the transform from the transform determiner 212. The ASR 214 may then analyze the speech based on the transform data structure 300 such that changes in the way the user speaks, in the noisy environment, may be analyzed or adjusted to prevent interpretation errors. In this way, the ASR 214 can provide better speech recognition based on how the user 101 may change their speech in noisy environments.

A TTS 216 function can change the text-to-speech function of the media-playback device 102 based on the transform. Thus, any type of audio feedback from the media-playback device 102 to the user 101 may be changed by the TTS 216. These operations can include converting any inputs, such as text messages or emails being read by the media-playback device 102, but also administrative messages being spoken to the user 101. The TTS 216 can also apply the transform data structure 300, from the transform determiner 212, to change the different characteristics of the synthesized speech to better present an intelligible message to the user 101, even in noisy environments. In this way, rather than simply adjusting the volume of the spoken message, the TTS 216 can provide a spoken message that seems more intelligible as the message is transformed by something mimicking the Lombard Effect/Reflex.

The wake word function 218 can receive a wake word. To determine the wake word within a recording, the wake word function 218 can apply the transform data structure 300 from the transform determiner 212. This transform data structure 300 can allow the wake word function 218 to better search for the wake word within the periodic recordings of the sound environment. When the user changes their speech patterns based on noise in the environment 103, the wake word function 218 can still listen for and determine when the wake word is being provided based on changes in the user speech.

An implementation of a data structure, data store, or database 300, which may store one or more transforms associated with one or more sound environment profiles may be as shown in FIG. 3. The transform data structure 300 may be the same or similar to data structures included in the transform data structure/database 208. Each different type of sound environment profile (e.g., profile or levels for dB(A) and/or dB(C)) may include a data structure 300. As there may be different types of sound environment profiles, there may be more or fewer data structures 300 than that shown in FIG. 3, as represented by ellipses 326. Each data structure 300 can include one or more of, but is not limited to, a sound environment profile 302, one or more transforms 304, and/or metadata 306. Each data structure 300 can include more or fewer data portions or fields than those shown in FIG. 3, as represented by ellipses 322.

The sound environment profile 302 is a representation, whether mathematical or otherwise, of the sound environment. This sound environment profile 302 can indicate the measurements for dB(A) and/or dB(C). In other implementations, the sound environment profile 302 can indicate different types of frequency ranges and decibel levels of sound that may be present in different sound environments 103. For example, an environment at home with kids playing in the background might have a first profile 302, while the sound environment 103 experienced by the user 101 driving in a car may have a different profile 302. Each profile 302 has acoustic information based on different characteristics of the sound environment 103 that allow that sound environment profile 302 to be accessed and/or compared to future sound environments 103 to determine a similarity or a match (between the sound environment 103 and the sound environment profile 302). The match or similarity can be used to identify a transform 304 associated therewith.

One or more transforms 304 may be associated with the sound environment profile 302. The transform 304 can change or indicate changes to different characteristics of speech. There are five main components of any type of language. The speech components can include phonemes, morphemes, lexemes, syntax, and context. These along with both grammar, semantics, and pragmatics give meaning to different types of communication among individuals. The phoneme is the smallest unit of sound that may cause a change in meaning within a language. For example, the pronunciation of different letters in the alphabet are phonemes. A morpheme is the smallest unit of a word that provides a specific meaning to a string of letters, for example, a syllable. The lexeme is a set of inflected forms of a single word. Syntax is a set of rules which people use to construct full sentences. Context is how everything within the language works together to convey a particular meaning. Grammar can be a whole system and structure of a language, usually consisting of syntax and morphology. Semantics is the meaning of words or phrases in a language. Pragmatics is the effect of context on the meaning of a word or phrase. Any of these different types of components of speech may be changed or indicated as changed in the transform 304, including grammar, semantics, pragmatics, or any of the different components of speech listed above or otherwise. For example, with a grammar change, the object of the sentence may be said first and the subject follow, e.g., appointment at 3:30 pm, you have. This change, similar to how Yoda speaks, can emphasize the more important part of the message first to ensure the user hears that part better.

The transform 304 can list how the changes are made to the language components above based on the sound environment profile 302. The transform data structure 300 can include, for example, one or more of, but is not limited to, an identifier (ID) 307, a speed transform 308, a duration transform 310, a pitch transform 312, a separation transform 314, a phoneme transform 316, a morpheme transform 318, and/or a frequency range transform 320. There may be more or fewer transforms of the different components of speech within the transform 304, as represented by the ellipses 324.

The ID 307 can be any type of ID, including, but not limited to, a numeric ID, and alphanumeric ID, a globally unique ID (GUID), etc. The ID 307 allows the correct transform to be indicated and communicated to the different components within the system 105.

The speed transform 308 can indicate how fast or slow a phoneme, morpheme, or other component of the message should be communicated or interpreted. As noise increases in an environment, the speed at which phonemes, morphemes, or other components of speech are presented to the user is changed (e.g., may be slowed). In this way, it is easier for the user to hear the differences in the phoneme, morpheme, or other component within a communicated message.

Similarly, the duration transform 310 indicates a duration change for each different phoneme, morpheme, the pauses between words, phonemes, etc., or other component of speech, which duration can also increase. Thus, as things get louder the duration at which something is spoken may take longer, based on changes to the words or pauses between words. These speed and duration changes are typical changes, based on the Lombard Reflex, which are automatically made by users in noisy environments.

As explained above, the Lombard Effect or Lombard Reflex is the involuntary tendency for speakers to increase their vocal effort when speaking in loud noise in order to enhance the audibility of their voice. These changes can include loudness but also include other acoustic features, for example, pitch, rate, and duration of syllables or phonemes. Due to the Lombard Reflex, humans automatically change the way they speak to better communicate in noisy environments. The different transforms 304 can mimic the Lombard Reflex, thus providing a more audible message to a human, rather than simply increasing the volume of the message. Rather, the phonemes, morphemes and other components acoustically change to better communicate a better understandable message to humans. Further, the transforms 304 also help the system 105 interpret received messages from the user, when the user 101 is changing their speech patterns due to a noisy environment.

A pitch transform 312 can change the frequency or pitch of a phoneme. This pitch transform 312 can increase (or decrease) the pitch as the sound environment 103 gets louder. Higher pitched sounds are usually easier to hear in noisy environments. As such, humans, based on the Lombard Reflex, naturally increase the frequency or pitch of different parts of speech. These pitch changes are indicated in the pitch transform 312.

There may be a natural separation between each word, phoneme, and/or morpheme. These separations can be elongated as the level of noise increases. Thus, each word, phoneme, morpheme, and/or other component is more distinct and has more emphasis as there is more separation between the different word, phoneme, morpheme, and/or other component. The separation transform 314 indicates the length of the separation that may be useful in conveying speech in noisy environments.

The transform 304 can also change the phonemes 316 or the morphemes 318. These phoneme and morpheme changes 316, 318 can include how the phonemes and morphemes are articulated. Changing the angle of attack or departure of the sound or making other changes can change the tone or perceptibility of these different phonemes and morphemes. This type of phoneme and morpheme change is recorded in field(s) 316, 318.

The frequency range transform 320 can change the frequency at which things in the speech are received or presented. For example, in a car, lower frequency sounds or speech are harder to perceive. As such, the ASR 214 may only use higher frequency ranges to recognize speech. Thus, these frequency range transforms can change how the ASR 214 works or perceives the different communications based on the noise in the sound environment 103. Further, the TTS 216 may increase the frequency of sounds.

Figure 4:
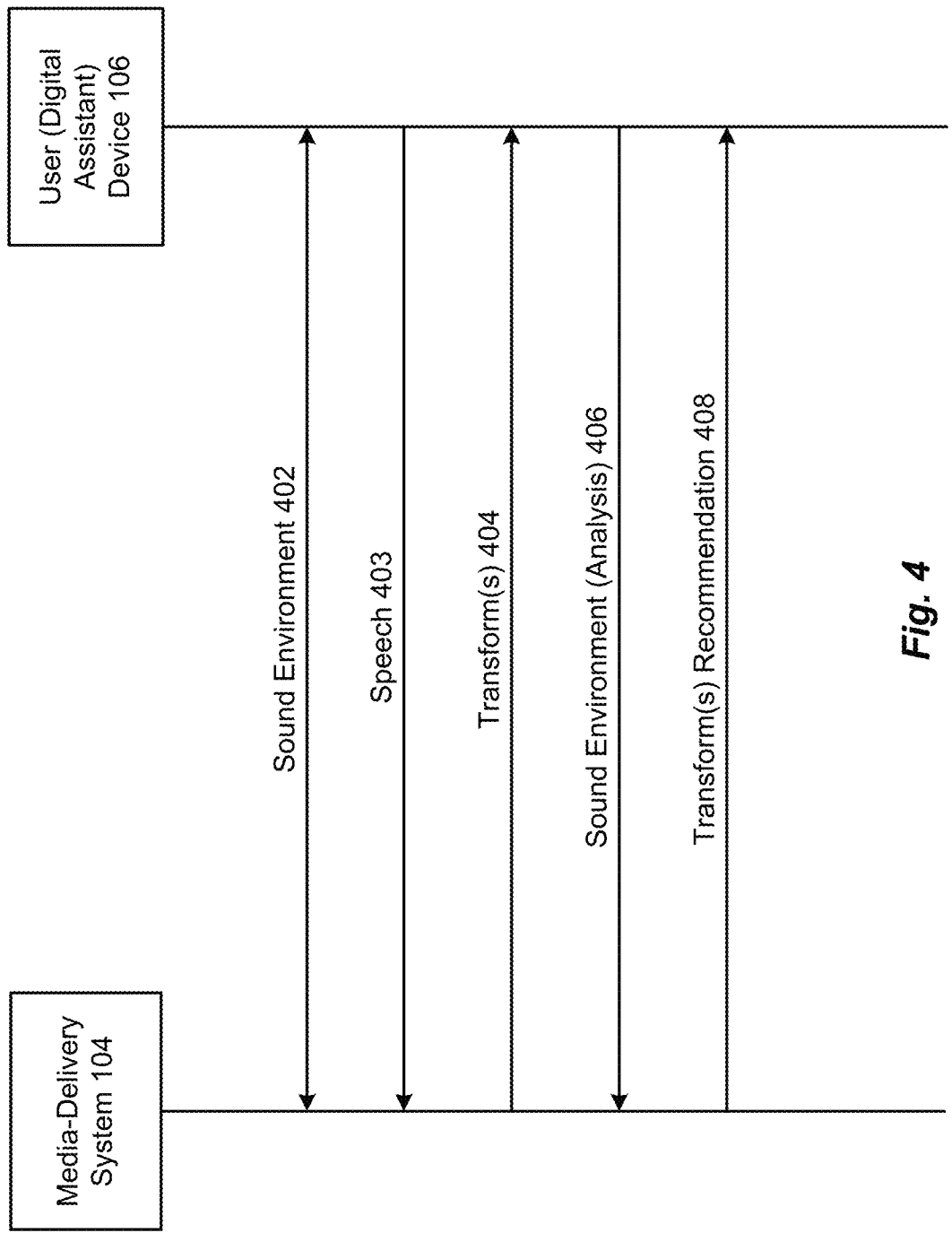
FIG. 4 is a signaling or signpost diagram of signals processed by the devices and systems herein in accordance with aspects of the present disclosure.

An embodiment of a signaling process may be as shown in FIG. 4. The messages or communications may be sent between the media-playback device 102 and the media-delivery system 104. The media-delivery system 104 and the media-playback device 102 can exchange sound environment information in sound environment signal 402. If a sound environment 103 is being simulated, the media-delivery system 104 may send the sound environment signal 402 to the media-playback device 102. If the user is receiving or conducting functions with the media-playback device 102, the media-playback device 102 may send sound environment information in signal 402 back to the media-delivery system 104 to allow the media-delivery system 104 to perform one or more other function.

Sometime thereinafter, the media-playback device 102 may receive speech input from the user 101 and send that speech input, as signal 403, back to the media-delivery system 104. Based on the speech signal 403 and/or other information, including the sound environment information, from the media-playback device 102, the media-delivery system 104 can create a transform(s) to be used by the media-playback device 102, in signal 404. The media-delivery system 104 can evaluate the sound environment and the context of the input to create and distribute the transform(s) 300, in signal(s) 404, back to the media-playback device 102.

Thereinafter, information about a currently-experienced sound environment 103 may be sent in a sound environment (analysis) signal 406 from the media-playback device 102 to the media-delivery system 104. The media-delivery system 104 can evaluate the sound environment 103 information to match a sound environment profile 302, retrieve the associated transform(s) 304, and present the transform(s). Thus, based on this sound environment 103 information and the context provided, a transform recommendation 408 may be sent back to the media-playback device 102. Transform recommendation signal 408 can also include the one or more transforms created by the media-delivery system 104 to be stored at the media-playback device 102, without the media-playback device 102 needing to communicate, in the future, with the media-delivery system 104 to conduct the operations described herein.

Figure 5:
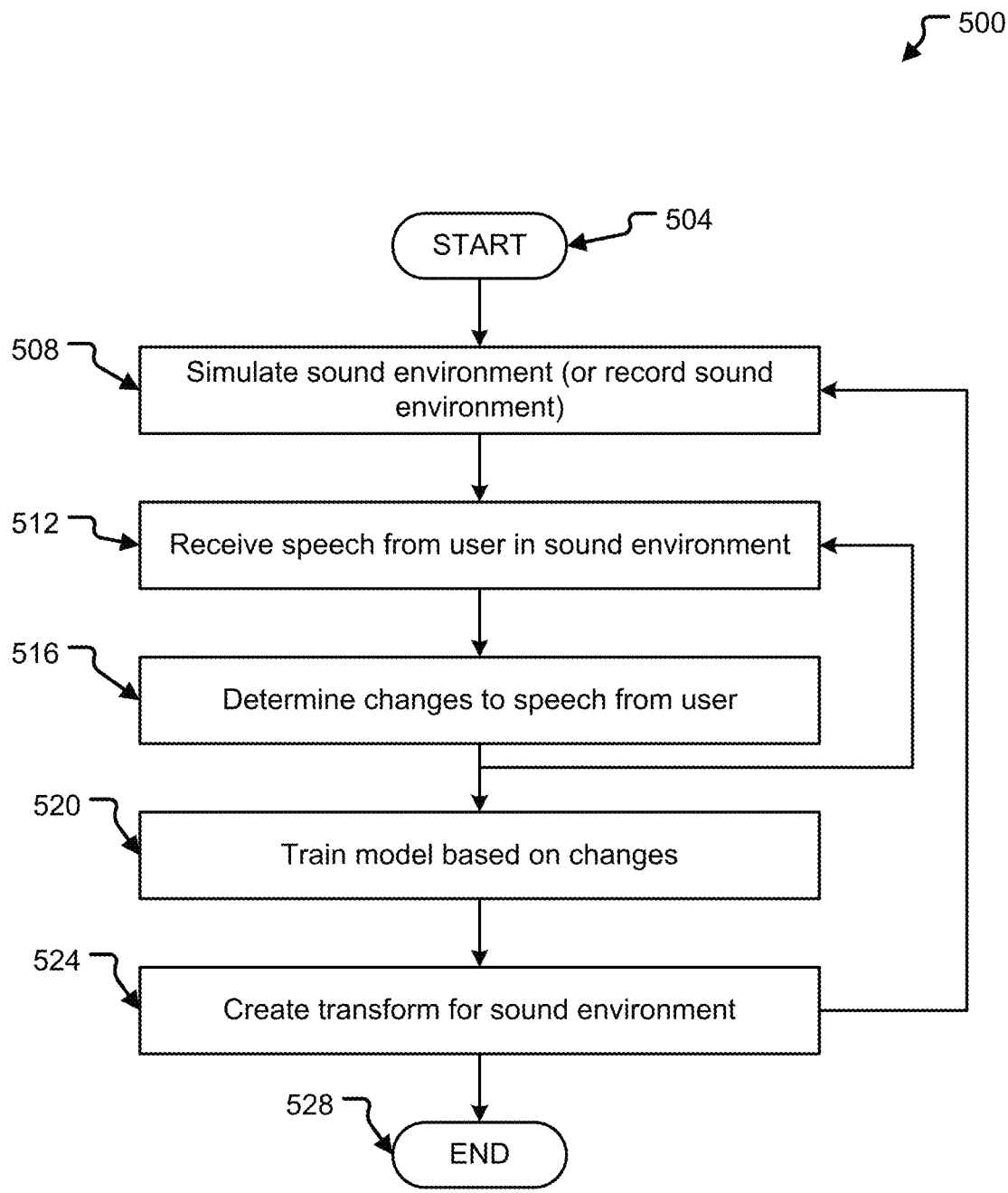
FIG. 5 is a method diagram of a method for creating a transform in accordance with aspects of the present disclosure.

An implementation of a method 500 for creating a transform may be as shown in FIG. 5. The method 500 can start with a start operation 504 and can end with an end operation 528. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, data structures, etc. described herein.

A sound environment simulator 202 can simulate a sound environment, in step 508. The sound environment simulator 202, of the media-playback device 102 or media-delivery system 104, may simulate a sound environment 103. The sound environment 103 can be various different types of sound environments either recorded in a natural environment and reproduced or an artificial sound environment that is synthesized or created from previous recordings. The sound environments 103 produce quiet (45 dB or less) and noise (50 dB or higher) to stimulate the Lombard Reflex in the user 101. This allows speech to be recorded from the user, in quiet and noisy environments, to understand how certain phonemes, morphemes, or other speech components are changed or need to be changed to adjust to the noisy environment(s).

In some implementations, rather than provide a synthesized sound environment, the natural sound environment is recorded, with the speech input, which is stimulating the Lombard Reflex. Therefore, the sound environment profile 302 can be deduced from the actual recording of the user's voice with the speech and also analyzed to determine the effect of the background noise on the speech of the user 101.

The speech analyzer 204 may then receive speech from the user, in the sound environment 103, in step 512. The user 101 may speak some test phrases, for example, test phases 902, as shown in table 900 of FIG. 9A. These test phrases 902 may be repeated with different sound environments 103 being simulated or recorded (e.g., quiet versus noisy). The changes in the speech may be determined from these repeated phrases. For example, the first sound environment 103 may be a quiet sound environment with the phrase 902a, in table 900, being recorded. The sound environment 103 may then be changed to a noisy sound environment to determine the changes in that phrase 902a when the user 101 reflexively changes her or his speech pattern due to the Lombard Reflex.

The speech analyzer 204 can determine changes to the speech from the user 101, in step 516. As explained, the speech changes may be evidenced in the duration, pitch, changes to the phonemes, changes to the morphemes, changes to the speed or separation of phonemes or morphemes, etc. Further, the changes may impact different phonemes differently. For example, referring again to FIG. 7, the phonemes of different speech in the English language fall at different frequency levels. As seen in chart 700, frequency is mapped on the x-axis 702 and the loudness, in decibels, is on the Y axis 704. Different loudness and frequency ranges for different phonemes are shown. For example, the group 714 may have high frequency and high loudness. Group 706 may have lower frequency and also increased loudness. In the other groups 708-712, the loudness and frequency levels are between groups 706 and 714. Thus, a sound environment 103 with greater low frequency sound or noise can affect phonemes in group 706 more than phonemes in group 714. Therefore, the changes to the speech may affect different phonemes differently depending on the level of sound or noise, frequency of the sound or noise, and type of sound environment 103.

As shown in charts 800-808 in FIGS. 8A-F, phonemes also may have a different changes, e.g., a longer duration depending on which phoneme is being evaluated and the type of sound environment 103. For example, the "el" sound may have a longer duration change in noisy environments compared to the "f" sound, which may not change in noisy environments. The charts 800-810 show several phonemes and the changes that occur to the sounds, which may speed up or slow down, change pitch, or show other changes, in noisy environments.

The charts 1000, 1006, 1012, and 1022, in FIGS. 10A through 10D, show the differences both between a voice of a first user and a voice of a second user and the effects of low frequency wind noise on pronunciations for the first user and the second user of the same phrase. For example, the graph or chart in FIG. 10A shows a frequency spectrum comparison between the first user 1002 and the second user 1004 saying the same phrase. As shown in the chart 1000, the first user 1002 has a higher frequency towards the top of the chart, while the second user 1004 has a lower frequency voice at the bottom of the chart. Therefore, in low frequency noise environments, the voice of the second user is more likely to be obscured.

This obfuscation is evident from the frequency spectrum chart 1006, shown in FIG. 10B. Chart 1006 shows the first user 1002, in a windy environment 1008 (compared to the quiet environment 1010), can still be heard better than the second user 1004 shown in the same windy environment 1008. As such, the treatment of the voice of the second user may be different. The metadata 306, in the transform data structure 300, may store the frequency range of the voice of the user 101, and there may be two or more transforms 304, for the same sound environment profile 302, based on the frequency range of the voice of the user 101 or other types of metadata.

Further, the amount of interference changes based on the amount of wind, for example, as shown in charts 1012, 1022 of FIGS. 10C and 10D. The frequency spectrum display of the same phrase shown previously in FIGS. 10A and 10B can be clearly seen without wind, as shown in column 1014. As the wind increases up to 4 m/s, the frequency range is partially obscured, as shown in column 1016 and as shown in columns 1024, 1026, 1028, and 1030, including blow-up section 1032, and more obscured, as shown in columns 1018 and 1020, as the wind continues to increase to 5 m/s and 6 m/s, respectively.

The comparison of speech in the quiet environment to speech in the noisy environment is repeated at least once, as shown by the arrow proceeding from step 516 back to step 512. These various different changes in environments and adjustments a user 101 makes both to speed, duration, pitch, phoneme/morpheme separation, frequency range transformations, etc. is determined. This change information is then used to train a model by the speech transform creator 206, in step 520. The speech transform creator 206 can ingest data from several users over several iterations of speaking test phrases in several sound environments 103. Based on the various changes, the speech transform creator 206 can provide average measurements for each of the different transforms 308 through 320. The model then creates the transform data structure 300 to be stored in the transform database 208, in step 524. A confidence interval may be used to determine the strength of the transform compared to the sound environment 103. This information may be stored in the transform database 208 by the speech transform creator 206.

Figure 6A:
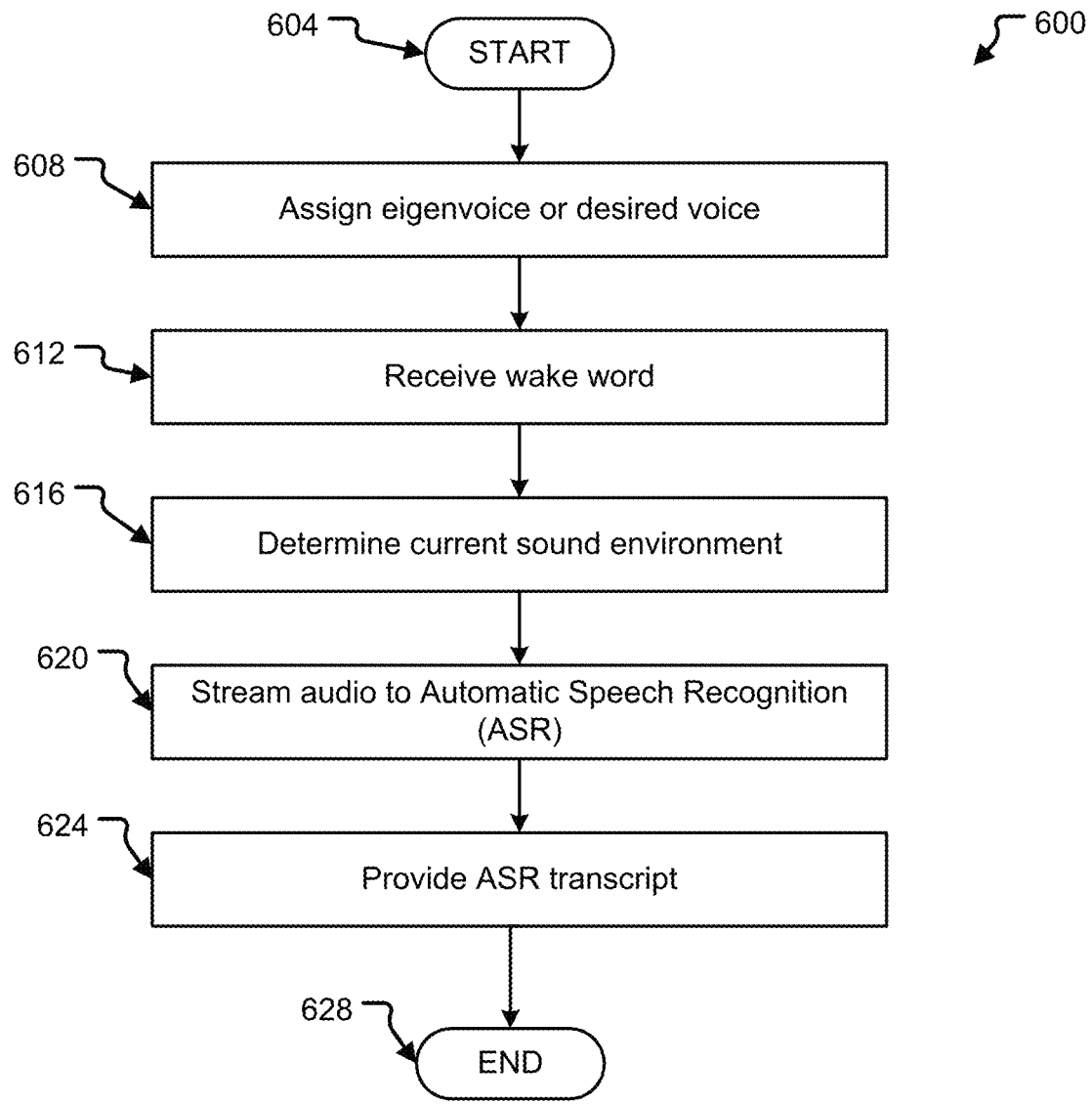
FIG. 6A is a method diagram of a method for applying a transform in accordance with aspects of the present disclosure.

An implementation of a method 600 for applying a transform may be as shown in FIG. 6A. The method 600 can start with a start operation 604 and can end with an end operation 628. The method 600 can include more or fewer stages or can arrange the order of the stages differently than those shown in FIG. 6. The method 600 can be executed as a set of computer-executable instructions, executed by a computer system or processing component, and be encoded or stored on a storage medium. Further, the method 600 can be executed by a gate or other hardware device or component in an ASIC, a FPGA, a SOC, or other type of hardware device. Hereinafter, the method 600 shall be explained with reference to the systems, components, modules, software, data structures, etc. described herein.

The content output device 158 or other component can assign a desired voice or receive a selection for a desired voice for output speech, in step 608. The desired voice is a default voice that is used to produce spoken messages to a user 101. The user 101 may also select the desired voice, which may be different than the desired voice.

The wake word function 218 can receive a wake word recording, in step 612. The wake word function 218 can continually record some duration of sound, for example, the wake word function 218 may maintain a continuous buffer of six seconds of recorded audio. The wake word function 218 may then scan, for the wake word, in the buffered sound. This wake word function 218 can access a transform data structure 300 to locate the wake word as changed or modified by the Lombard Effect. Thus, the wake word function 218 can adjust the reception of the wake word based on the transform.

The sound environment analyzer 210 can analyze the background noise to determine the current sound environment before receiving or received with the wake word recording, in step 616. The sound environment analyzer 210 can calculate dB(A) and/or dB(C). In implementations, the sound environment analyzer 210 can characterize the sound environment by determining dB(C) alone. In some configurations, differences and similarities between dB(A) and dB(C) can assist in determining the sound environment. For example, higher dB(C) can indicate low frequency noise, for example, wind noise in a car. The sound environment analyzer 210 may also infer noise based on other parameters, for example, the state of a vehicle (e.g., windows open, speed, etc.).

The sound environment analyzer 210 can then compare this analyzed sound to the sound environment profile 302 stored in the transform database 208 (e.g., matching the determined dB(C) to the sound profile). Upon finding a similar profile 302 to the sound environment, the sound environment analyzer 210 can report which profile 302 has a statistically significant similarity to the current environment to the transform determiner 212. The transform determiner 212 may then extract or retrieve the transform 304 from the data structure 300. The determination of which transform 304 to use may also be based on metadata 306 received from the media-playback device 102.

The transform 304 may then be provided to the wake word function 218. The transform 304 may then be applied to the received input to better evaluate the possibility of the wake word being present in the recording of the noisy environment. Upon determining that the wake word was received, the method 600 can proceed to step 620. The ASR 214 can the receive streamed audio, in step 620. The ASR 214 may then recognize the speech based on using the transform 304 to analyze the phonemes, morphemes, or other speech components that have been altered due to the Lombard Effect motivated by the user being in a noisy environment. Thus, the ASR 214 can apply the transforms 308-320 to change the analysis of the speech components and identify the words that have been spoken in the noisy environment. The ASR 214 can then provide the ASR transcript, which is text, in step 624.

Figure 6B:
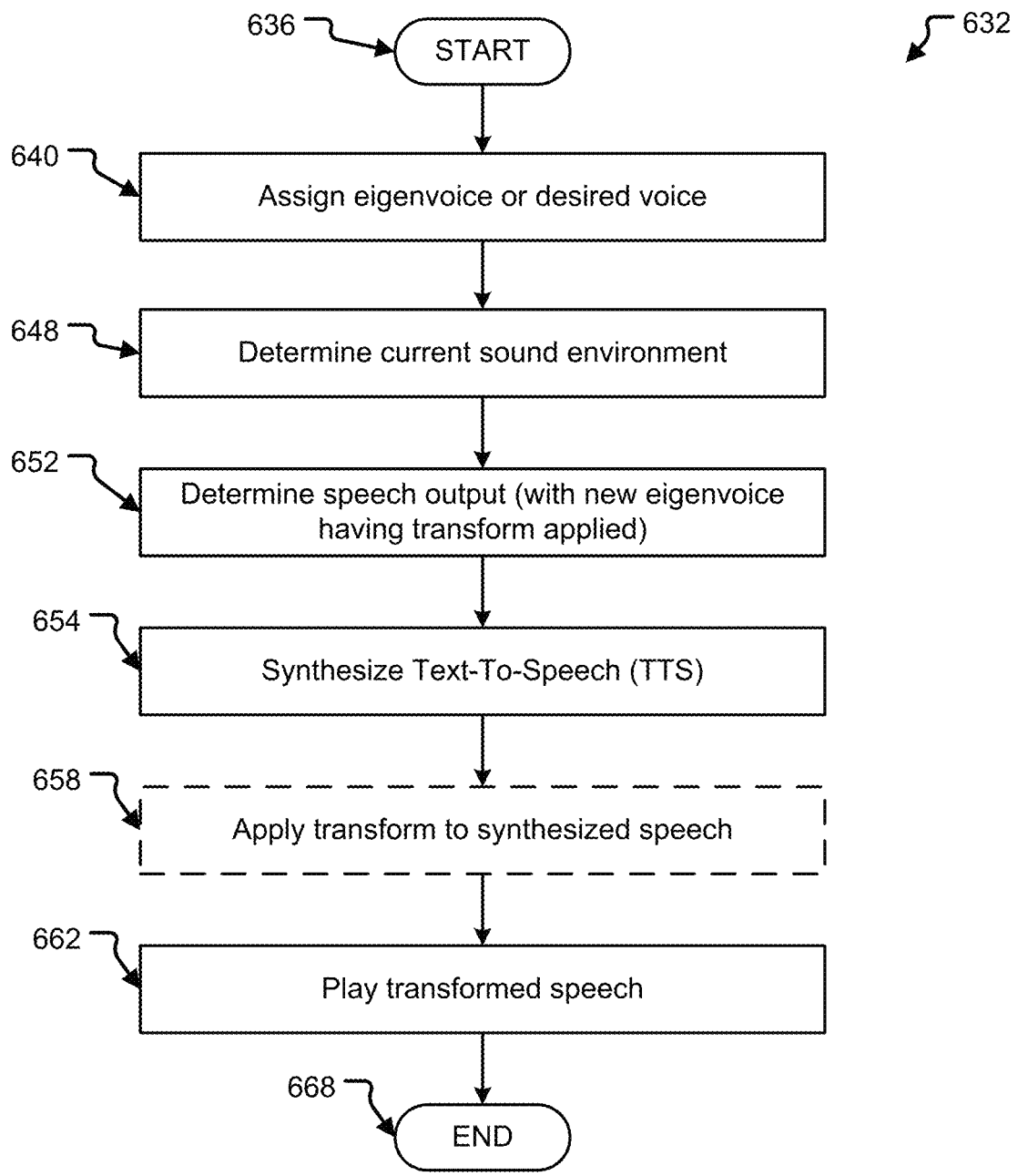
FIG. 6B is another method diagram of a method for applying a transform in accordance with aspects of the present disclosure.

Another implementation of a method 632 for applying a transform may be as shown in FIG. 6B. The method 632 can start with a start operation 636 and can end with an end operation 668. The method 632 can include more or fewer stages or can arrange the order of the stages differently than those shown in FIG. 6. The method 632 can be executed as a set of computer-executable instructions, executed by a computer system or processing component, and be encoded or stored on a storage medium. Further, the method 632 can be executed by a gate or other hardware device or component in an ASIC, a FPGA, a SOC, or other type of hardware device. Hereinafter, the method 632 shall be explained with reference to the systems, components, modules, software, data structures, etc. described herein.

The content output device 158 or other component can assign an initial desired voice or receive a selection for a desired voice for output speech, in step 640. The initial desired voice is a default voice that is used to produce spoken messages to a user 101. The user 101 may also select the desired voice, which may be different than the default voice.

The sound environment analyzer 210 can analyze the background noise environment before conducting other operations, in step 648. Again, the sound environment analyzer 210 can calculate dB(A) and/or dB(C). In implementations, the sound environment analyzer 210 can characterize the sound environment by determining dB(C) alone. In some configurations, differences and similarities between dB(A) and dB(C) can assist in determining the sound environment. For example, higher dB(C) can indicate low frequency noise, for example, wind noise in a car. The sound environment analyzer 210 may also infer noise based on dB(A), dB(C), and/or other parameters, for example, the state of a vehicle (e.g., windows open, speed, etc.).

The sound environment analyzer 210 can then compare this analyzed sound to the sound environment profile 302 stored in the transform database 208 (e.g., matching the determined dB(C) to the sound profile). Upon finding a similar profile 302 to the sound environment, the sound environment analyzer 210 can report which profile 302 has a statistically significant similarity to the current environment to the transform determiner 212. The transform determiner 212 may then extract or retrieve the transform 304 from the data structure 300. The determination of which transform 304 to use may also be, at least partially, based on metadata 306 received from the media-playback device 102.

The transform 304 may then be provided to the TTS 216. In configurations, the transform 304 may then be applied to retrieve or generate a transformed voice. The transformed voice can apply characteristics (as described in FIGS. 8A-8F) to mimic the Lombard effect to the transformed voice. Thus, the transforms 308-320 may be applied to the desired voice to generate speech output with the transformed voice.

The TTS 216 may then determine speech output that is to be performed in response to a request or interaction with the user 101 received by and transcribed by the ASR 214, in step 652. Speech output is the synthesis of the text to be output. To properly synthesize the output for the noisy environment, the TTS 216 can user the transformed voice or can receive and apply the transform 304 from the transform determiner 212. The transform 304 applies to the associated sound environment profile 302.

The TTS 216 can then synthesize text-to-speech, in step 654. The TTS 216 can synthesize the text with the transformed voice. The transformed voice can apply the Lombard Effect to make the speech output seem more realistic to the human ear. Thus, the desired voice can change the speed, duration, pitch, phoneme and morpheme separation, the form of the phoneme or morpheme, the pause between words, the used frequency ranges, etc. to generate the speech output. Thus, the TTS 216 need not transform the speech after it is synthesized but can directly generate speech for the noisy environment. In implementations, the transform may be applied to sounds in a partial band of frequencies.

However, in alternative configurations, the TTS 216 can apply the transform 304 to speech from the initial desired voice, in step 658, to change the speed, duration, pitch, phoneme and morpheme separation, the form of the phoneme or morpheme, the pause between words, the used frequency ranges, etc. to generate the speech output. These changes apply characteristics that mimic the Lombard Effect after the speech is synthesized to make the transformed speech output seem more realistic to the human ear. For example, a first phoneme may be pronounced in a first frequency range and a second phoneme may be pronounced in a second frequency range, and wherein a first change to the first phoneme is different than a second change to the second phoneme based on a difference between the first frequency range and the second frequency range In some implementations, the speech is predetermined and stored in a look-up table, for example, table 900 can function as a look-up table. The desired phrase can be determined from selections 902a-902c. Then, depending on the sound environment 904a-904c, the TTS 216 can select a transformed speech output 906.

Figure 9B:
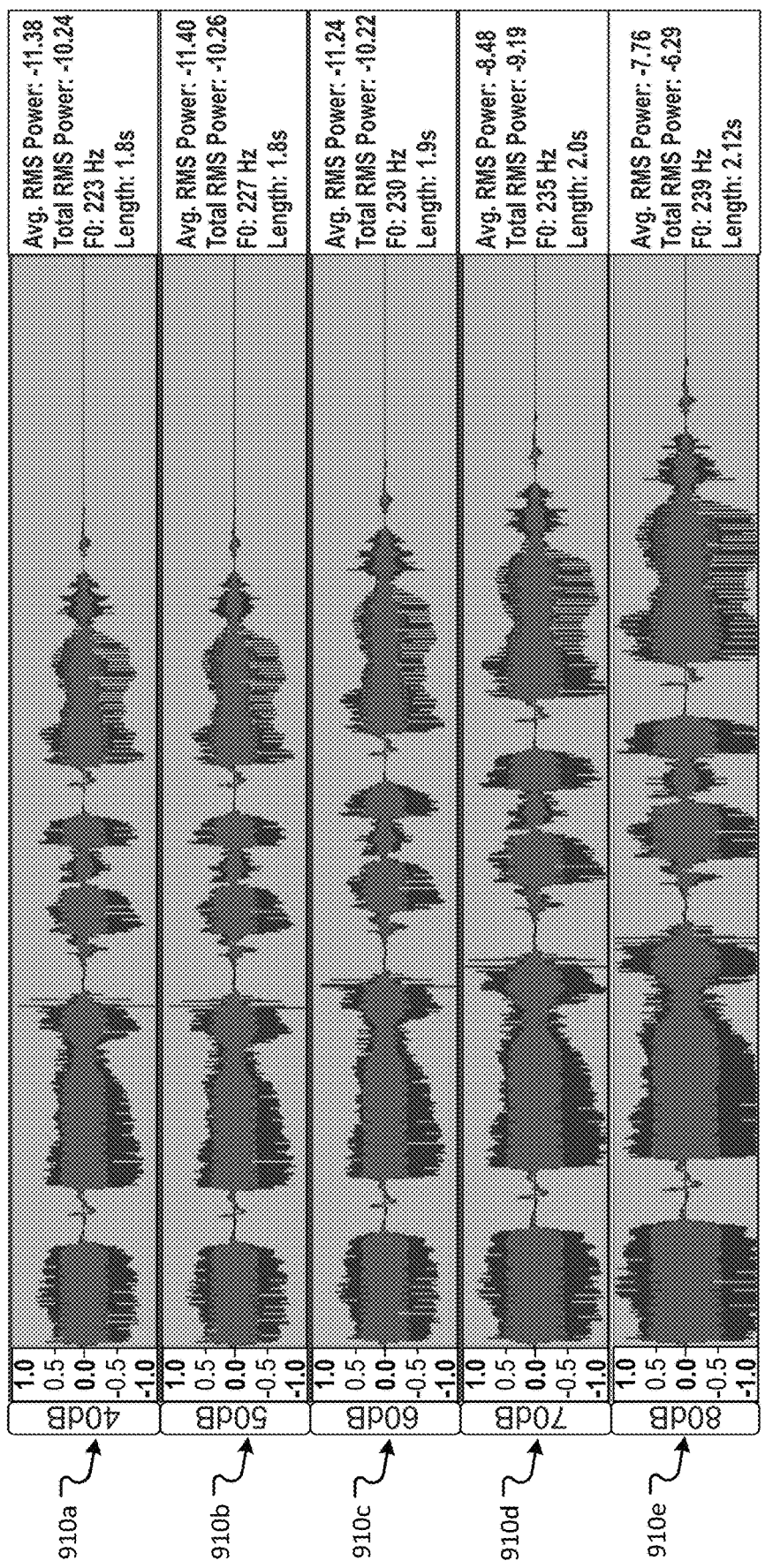
FIG. 9B is a representation of a spoken phrase that can be modified by a TTS function based on the sound environment in accordance with aspects of the present disclosure.

Regardless of the method used to transform the speech, the TTS 216 then provides that transformed speech to the content output device 158 to play the transformed speech, in step 662. The output is designed for the sound environment 103 and should be more understandable to the user 101 even without turning up the volume. The speech output, for different sound environments, may appear as shown in FIG. 9B. The outputs 910a-910e change as the sound environment becomes noisier. As can be seen in FIG. 9B, the loudness of the words increases, the pitch increases, the pause between words can increase, the overall length of the sentence can increase, etc. All of these changes make the output more understandable to the user 101 without changing or adjusting the volume of the media-playback device.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIGS. 1, 2A, and/or 2B may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
providing, by a media delivery system, a first audio representation of a first simulated sound environment;
receiving, by the media delivery system, first speech from a user speaking subject to audio playout of in the first simulated sound environment;
providing, by the media delivery system, a second audio representation of a second simulated sound environment, wherein the second simulated sound environment has different acoustic characteristics than the first simulated sound environment;
receiving, by the media delivery system, second speech from the user speaking subject to audio playout of the second simulated sound environment;
determining a change in a speech component between the first speech and the second speech; and
based on the change in the speech component, creating a transform to adjust the speech component.

2. The method of claim 1, wherein the change in the speech component is associated with one or more of a change to a phoneme, in a speed of the phoneme, in a duration of the phoneme, to a separation between phonemes, to a separation between morphemes, in a pitch of the phoneme, in a frequency range for the phoneme, or in a pause between words.

3. The method of claim 2, wherein the change in the speech component mimics the Lombard Effect.

4. The method of claim 2, wherein a first phoneme is pronounced in a first frequency range and a second phoneme is pronounced in a second frequency range, and wherein the change to the speech component involves a first change to the first phoneme that is different than a second change to the second phoneme based on a difference between the first frequency range and the second frequency range.

5. The method of claim 1, further comprising:
assigning a desired voice;
receiving a request from the user;
determining a current sound environment for the user;
determining text to output to the user in response to the request;
synthesizing the text, by Text-To-Speech (TTS), to create speech output;
applying the transform to the speech output; and
playing the transformed speech output.

6. The method of claim 5, wherein the request from the user is a wake word, the method further comprising:
retrieving the transform; and
adjusting a reception of the wake word based on the transform.

7. The method of claim 5, further comprising:
receiving third speech from the user in the request;
retrieving the transform; and
adjusting a speech recognition of the third speech based on the transform.

8. The method of claim 1, wherein the transform is associated with the second simulated sound environment.

9. The method of claim 1, wherein the first simulated sound environment is quieter than the first simulated sound environment.

10. The method of claim 9, wherein the first simulated sound environment has a sound level of 45 dB or less, and wherein the second simulated sound environment has a sound level of over 50 dB.

11. The method of claim 1, wherein the transform is applied to sounds in a partial band of frequencies.

12. A system comprising:
a memory; and
a processing unit coupled to the memory, wherein the processing unit is operative to:
provide, by a media delivery system, a first audio representation of a first simulated sound environment;
receive, by the media delivery system, first speech from a user speaking subject to audio playout of the first simulated sound environment;
provide, by the media delivery system, a second audio representation of a second simulated sound environment, wherein the second simulated sound environment has different acoustic characteristics than the first simulated sound environment;
receive, by the media delivery system, second speech from the user speaking subject to audio playout of the second simulated sound environment;
determine a change in a speech component between the first speech and the second speech; and
based on the change in the speech component, create a transform to adjust the speech component.

13. The system of claim 12, wherein the change in the speech component is associated with one or more of a change to a phoneme, in a speed of the phoneme, in a duration of the phoneme, to a separation between phonemes, to a separation between morphemes, in a pitch of the phoneme, in a frequency range for the phoneme, and wherein the change in the speech component mimics the Lombard Effect.

14. The system of claim 12, the processing unit further operative to:
assign a desired voice;
receive a request from the user;
determine a current sound environment for the user;
determine text to output to the user in response to the request;
synthesize the text, by Text-To-Speech (TTS), to create speech output;
apply the transform to the speech output; and
play the transformed speech output.

15. The system of claim 14, wherein the request from the user is a wake word, the processing unit further operative to:
retrieve the transform; and
adjust a reception of the wake word based on the transform.

16. The system of claim 14, the processing unit further operative to:
receive third speech from the user in the request;
retrieve the transform; and
adjust a speech recognition of the third speech based on the transform.

17. A method comprising:
determining, by a media-playback device, a sound environment from received background noise;
selecting a sound profile with similar audio characteristics as the received background noise, wherein the sound profile is associated with a transform for speech;
determining speech output;
applying the transform to the speech output to create transformed speech; and
playing, by the media-playback device, the transformed speech.

18. The method of claim 17, wherein a characteristic associated with the transform comprises one or more of a change to a phoneme, in a speed of the phoneme, in a duration of the phoneme, to a separation between phonemes, to a separation between morphemes, in a pause between words, in a pitch of the phoneme, in a frequency range for the phoneme, and wherein the transform mimics the Lombard effect.

19. The method of claim 17, wherein a user can understand the transformed speech in the sound environment without changing a volume of the media-playback device.

20. The method of claim 17, wherein determining the sound environment comprises determining a dB (A) or a dB (C).

* * * * *